(12) United States Patent
Breeze

(10) Patent No.: US 10,654,090 B2
(45) Date of Patent: May 19, 2020

(54) METHOD OF FORMING A ROLLER ELEMENT BEARING CAGE COMPRISING A SUPPORTING FRAME AND A REINFORCING FRAME

(71) Applicant: Bowman International Limited, Abingdon, Oxfordshire (GB)

(72) Inventor: Ian Breeze, Oxfordshire (GB)

(73) Assignee: Bowman International Limited, Abingdon (GB)

( * ) Notice: Subject to any disclaimer, the term of this patent is extended or adjusted under 35 U.S.C. 154(b) by 267 days.

(21) Appl. No.: 15/599,932

(22) Filed: May 19, 2017

(65) Prior Publication Data

US 2018/0010644 A1    Jan. 11, 2018

(30) Foreign Application Priority Data

May 20, 2016 (GB) .................................. 1608921.1

(51) Int. Cl.
*B21D 53/12* (2006.01)
*F16C 33/46* (2006.01)
(Continued)

(52) U.S. Cl.
CPC .............. *B21D 53/12* (2013.01); *F16C 19/26* (2013.01); *F16C 19/36* (2013.01); *F16C 19/361* (2013.01); *F16C 33/3887* (2013.01); *F16C 33/467* (2013.01); *F16C 33/4611* (2013.01); *F16C 33/4641* (2013.01); *F16C 33/4676* (2013.01); *F16C 33/504* (2013.01); *F16C 43/065* (2013.01); *F16C 33/4605* (2013.01); *F16C 33/547* (2013.01); *F16C 2220/04* (2013.01); *F16C 2220/20* (2013.01); *F16C 2220/24* (2013.01)

(58) Field of Classification Search
CPC .......................... F16C 43/065; F16C 33/4776; F16C 33/4641; F16C 33/4611; F16C 33/504; F16C 33/3887; F16C 33/467; F16C 33/4605; F16C 33/547; F16C 19/26; F16C 19/36; F16C 19/361; F16C 2220/04; F16C 2220/20; F16C 2220/24

See application file for complete search history.

(56) References Cited

U.S. PATENT DOCUMENTS 3,042,464 A    7/1962   Göthberg
8,757,889 B2 *  6/2014  Jaekel .................. F16C 33/504
                                                    384/577
(Continued)

FOREIGN PATENT DOCUMENTS

DE    102009017598    10/2010
DE    102014219728    3/2016
(Continued)

*Primary Examiner* — Moshe Wilensky
(74) *Attorney, Agent, or Firm* — Carmody Torrance Sandak & Hennessey LLP

(57) ABSTRACT

The invention relates to a method of forming a rolling element bearing cage assembly, comprising forming one or more segments, the forming of each segment comprising: forming a supporting frame having a plurality of spaced apart openings; forming a reinforcing frame including a corresponding plurality of openings each for aligning with the openings of the supporting frame; and inserting the reinforcing frame within the supporting frame.

16 Claims, 25 Drawing Sheets

(51) Int. Cl.
*F16C 33/50* (2006.01)
*F16C 19/26* (2006.01)
*F16C 19/36* (2006.01)
*F16C 33/38* (2006.01)
*F16C 43/06* (2006.01)
F16C 33/54 (2006.01)

(56) References Cited

U.S. PATENT DOCUMENTS

2015/0285305 A1* 10/2015 Claus .................. F16C 43/08
          384/575
2016/0108965 A1   4/2016 Kokumai et al.

FOREIGN PATENT DOCUMENTS

| EP | 2618013 | 7/2013 |
|----|---------|--------|
| EP | 2871378 | 5/2015 |
| FR | 2163079 | 7/1973 |
| JP | S4415450 | 7/1969 |
| JP | S50121144 | 10/1975 |
| JP | 2009243556 | 10/2009 |
| JP | 5866821 | 2/2016 |
| WO | 2008/129916 | 10/2008 |

* cited by examiner

A - A

B-B

G - G

METHOD OF FORMING A ROLLER ELEMENT BEARING CAGE COMPRISING A SUPPORTING FRAME AND A REINFORCING FRAME

BACKGROUND TO THE INVENTION

Field of the Invention

The present invention relates to rolling element bearing cages or rolling element bearing cage assemblies.

Description of the Related Art

Rolling element bearing cage assemblies are known in the art. A typical assembly comprises an inner ring and an outer ring, and rolling elements arranged in position between the inner ring and outer ring. The rolling element bearing cage assembly maintains separation of the rolling elements and interconnects the rolling elements for uniform rotation with respect to the inner and outer rings.

Example applications of a rolling element bearing cage assembly include, but are not limited to, automotive and truck transmissions, agricultural construction equipment, pumps and compressors, and two-cycle engines such as marine outboards, and garden equipment.

An aim of the present invention is to provide an improved rolling element bearing cage assembly.

SUMMARY OF THE INVENTION

There is provided a rolling element bearing cage assembly design having an increased load carrying ability, and more economic production costs than known rolling element bearing cage assemblies.

There is provided, in a first aspect, a novel structure. The novel structure provides a rolling element bearing cage assembly with tangs which are resilient.

In a first aspect there is provided a rolling element bearing cage comprising: a first annular ring; a second annular ring; at least one retainer portion attaching the first annular ring to the second annular ring to form the first and second annular rings in a cylinder-type structure; and a plurality of resilient tangs on each of the first and second annular rings, each tang protruding from the circumference of the respective annular ring at an angle with respect to the plane of the respective annular ring and toward the other annular ring.

Each annular ring may have an inner circumference and an outer circumference, wherein the at least one retainer portion is connected to the inner circumferences of the annular rings and the plurality of resilient tangs are connected to the outer circumferences.

Each resilient tang may have a first tang edge connected to the respective annular ring and a second tang edge opposite the first tang edge, wherein the length of the second tang edge is greater than the length of the first tang edge. Ends of the second tang edge may define retaining elements. The edges of the tangs between the first and second tang edges may define retaining elements. The retaining elements may be for retaining rolling elements. The distance between the ends of adjacent second tang edges may accommodate rolling elements. The third and fourth tang edges may join the first tang edge to the second tang edge are shaped to accommodate a rolling element. The shape of the third and fourth tang edges may be determined by the angle of the tangs to the plane of the annular rings.

Each annular ring may have a circumferential width defining a first and second edge, wherein the distance between the first edges of the annular rings corresponds to the space required to accommodate a rolling element at that edge.

There may be provided a plurality of retainer portions, and the spacing between adjacent retainer portions is less than the radius of a rolling element to be accommodated in the rolling element bearing cage.

The number of tangs may correspond to a number of rolling elements.

At least one retainer portion may be joined to the annular rings at a circumferential position on each annular ring which corresponds to the circumferential position of the first tang ends of an opposing pair of resilient tangs.

The circumferential position of connection of the at least one retainer portion to the inner circumference of the annular rings may be aligned with the circumferential position of connection of the opposing pair of resilient tangs to the outer circumference of the annular rings.

There may be provided a plurality of retainer portions attaching the first annular ring to the second annular ring. Each retainer portion may be joined to the annular rings at circumferential positions on each annular ring which correspond to the circumferential position of the tang ends of each of opposing pairs of resilient tangs. The circumferential position of connection of the retainer portions to the inner circumference of the annular rings may be aligned with the circumferential position of connection of the opposing pairs of resilient tangs to the outer circumference of the annular rings.

The retainer portions may be of a thickness such that they form at least part of the tangs.

The first annular ring and the second annular ring may each comprise one part.

The first annular ring and the second annular ring may each comprises two parts.

The first annular ring and the second annular ring may each comprise three or more parts.

In a second aspect there is provided a method of forming a rolling element bearing cage comprising: forming a planar strip of material, having a length corresponding to a circumferential dimension of a rolling element bearing cage; forming openings in the planar strip, corresponding to positions at which rolling elements are to be located; forming a plurality of tangs, alongside and part of each side of the length of the planar strip, each tang having a first tang edge of a first length adjoining the strip and a second edge of a second length opposite the first tang edge; and bending each side of the length of the strip such that the plurality of tangs is positioned at an angle with respect to the planar strip, wherein the fold is through an angle of greater than 90° and less than or equal to 180° relative to the plane of the planar strip.

The method may further comprise an initial bending step comprising bending the planar strip of material such that the planar strip of material forms at least part of the circumference of a cylindrical-type structure with the tangs protruding therefrom, the following bending step then bending the bent part of the planar strip.

The method may further comprise bending the planar material such that material forms a part of the circumferential section of a cylinder-type structure.

In a third aspect there is provided a rolling element bearing cage formed of one or more segments, each segment comprising: a supporting frame having a plurality of spaced apart openings each for accommodating a rolling element;

and a reinforcing frame, inserted within the supporting frame, having a corresponding plurality of openings each for aligning with the openings of the supporting frame.

The supporting frame and the reinforcing frame may be made of different materials.

The material of one of the reinforcing frame and the supporting frame may be more durable than the material of the other.

The material of one of the reinforcing frame and the supporting frame may be more expensive than the other.

The reinforcing frame may be provided with a plurality of internal voids, the voids being filled with a filling material.

The supporting frame and the reinforcing frame may be indistinct from each other, and the resulting frame is provided with a plurality of internal voids, the voids being filled with a filling material.

The filling material may be the same material as the material of one of the supporting frame or the reinforcing frame.

The supporting frame may be provided with an internal void, the reinforcing frame being retained by being positioned within said void.

The supporting frame may comprise: a first annular ring; a second annular ring; a plurality of retainer portions attaching the first annular ring to the second annular ring to form the first and second annular rings in a cylinder-type structure; and a plurality of tangs on each of the first and second annular rings, each tang protruding from the respective annular ring at an angle with respect to the plane of the respective annular ring and toward the other annular ring.

The retainer portions may attach opposing tangs of the first and second angular rings.

The reinforcing frame may be provided through the internal void of the supporting frame.

The reinforcing frame may comprise a third annular ring. The third annular ring may be shaped to have edges which are accommodated by internal grooves in the first and second annular rings, and a central portion which is shaped to have openings between the retainer portions.

One or more openings of the reinforcing frame may protrude from the supporting frame, one or more openings of the supporting frame are not aligned with an opening of the reinforcing frame, and each other opening of the supporting frame is aligned with an opening of the reinforcing frame. The protruding portion of the reinforcing frame of a first segment may engage with the supporting frame of a second segment such that the one or more openings of that reinforcing frame align with the one or more openings in that supporting frame not aligned with the one or more openings of the reinforcing frame of that segment.

A rolling element may be provided in the at least one opening.

The protruding portion of the reinforcing frame of another segment may engage with the supporting frame of the first segment such that the one or more openings of that other reinforcing frame align with the one or more openings of that supporting frame.

The supporting frame may have a plurality of retainer portions between each opening, the reinforcing frame being positioned within the supporting frame such that it is rotated within the supporting frame by at least one complete retainer portion, one opening, and part of one further retainer portion, thereby a section of the reinforcing frame protruding from the supporting frame and a section of the supporting frame having a recessed section where the reinforcing frame is rotated from.

The section of the reinforcing frame protruding from the supporting frame of a first segment may engage with a recessed section of a supporting frame section of a second segment.

The rolling element bearing cage may be provided with one or more rolling elements provided in the one or more openings.

The section of the supporting frame having a recessed section of the first segment may engage with a protruding part of another segment.

One or more rolling elements may be provided in the one or more openings associated with the recessed section of the first segment and the protruding part of the other segment.

The rolling element may be any one of: a cylindrical roller; a taper roller; a spherical roller; a ball.

In a fourth aspect there is provided a rolling element bearing cage formed of one or more segments, each segment comprising: a supporting frame having a plurality of spaced apart openings each for accommodating a rolling element; and a reinforcing frame, inserted within the supporting frame, having a corresponding plurality of openings each for aligning with the openings of the supporting frame, wherein the supporting frame and the reinforcing frame are made of different materials.

In a fifth aspect there is provided a rolling element bearing cage formed of one or more segments, each segment comprising: a supporting frame having a plurality of spaced apart openings each for accommodating a rolling element; and a reinforcing frame, inserted within the supporting frame, having a corresponding plurality of openings each for aligning with the openings of the supporting frame, wherein at least one opening of the reinforcing frame protrudes from the supporting frame, at least one opening of the supporting frame is not aligned with the one or more openings of the reinforcing frame, and each other opening of the supporting frame is aligned with the one or more openings of the reinforcing frame.

In a sixth aspect there is provided a rolling element bearing cage formed of one or more segments, each segment comprising: a supporting frame having a plurality of spaced apart openings each for accommodating a rolling element; and a reinforcing frame, inserted within the supporting frame, having a corresponding plurality of openings each for aligning with the openings of the supporting frame, wherein the supporting frame has a plurality of retainer portions between each opening, the reinforcing frame being positioned within the supporting frame such that it is rotated within the supporting frame by at least one complete retainer portion, one opening, and part of one further retainer portion, thereby a section of the reinforcing frame protruding from the supporting frame and a section of the supporting frame having a recessed section where the reinforcing frame is rotated from.

In a seventh aspect there is provided a method of forming a rolling element bearing cage assembly, comprising forming one or more segments, the forming of each segment comprising: forming a supporting frame having a plurality of spaced apart openings; forming a reinforcing frame including a corresponding plurality of openings each for aligning with the openings of the supporting frame; and inserting the reinforcing frame within the supporting frame.

The method may comprise forming the supporting frame of a first material and forming the reinforcing frame of a second material, the second material being different to the first material.

The method may comprise providing the reinforcing frame with a plurality of internal voids, the voids being filled with a filling material.

The supporting frame and the reinforcing frame may be indistinct from each other, and the resulting frame is provided with a plurality of internal voids, the voids being filled with a filling material.

The method may comprise forming at least one void in the supporting frame, wherein the reinforcing frame is retained by being positioned within said at least one void.

Forming the supporting frame may comprise: forming a part of a cylinder-type structure comprising part of a first annular ring and part of a second annular ring held connected by a plurality of retainer portions.

Forming the reinforcing frame may comprise: forming a part of a further cylinder-type structure comprising part of a further first annular ring and part of a further second annular ring held connected by a plurality of further retainer portions.

The step of inserting may comprise providing the reinforcing frame through voids in the supporting frame.

A void may be formed in each retainer portion.

Forming the supporting frame may comprise: forming a part of a cylinder-type structure comprising part of a first annular ring and part of a second annular ring held connected by a plurality of retainer portions, and wherein the step of inserting comprises providing the reinforcing frame through voids in the supporting frame.

The cylinder type structure may comprise a plurality of tangs formed along the outer circumference of each of the first and second annular rings, at an angle to the plane of the respective annular ring and toward the other annular ring.

At least part of the cylinder-type structure is formed using 3D moulding, 3D printing or 3D additive manufacturing.

At least part of the cylinder-type structure may be at least part of the rolling element bearing cage, and one or more parts are connected to form a rolling element bearing cage.

This can be one segment with a joint to allow insertion that is then joined to itself to form the cage.

The step of inserting may be such that at least one opening of the reinforcing frame protrudes from the supporting frame, at least one opening of the supporting frame is not aligned with the one or more openings of the reinforcing frame, and each other opening of the supporting frame is aligned with an opening of the reinforcing frame, the method further comprising: connecting the one or more segments, the connecting comprising: engaging the protruding portion of the reinforcing frame of a first segment with the recessed portion of the supporting frame of a second segment such that the one or more openings of that protruding portion of the reinforcing frame aligns with the one or more openings in that supporting frame not aligned with the one or more openings of the reinforcing frame of that segment. In the case of only one segment, the connection is inserting the protruding portion of the segment into the recessed portion of the same segment.

The step of connecting may further comprise: engaging the protruding portion of the reinforcing frame of the second segment with the supporting frame of the first segment such that the one or more openings of that reinforcing frame aligns with thee one or openings in that supporting frame not aligned with an opening of the reinforcing frame of that segment. For only one segment this connection is to itself.

The method may further comprise the step, after the connecting, of: inserting a rolling element in each opening.

The rolling element bearing cage assembly may comprise one or more segments, each segment formed and connected according to above methods, the segments forming, when all connected, a cylindrical-type structure.

BRIEF DESCRIPTION OF THE DRAWINGS

The invention is described with reference to the accompanying drawings, in which.

DESCRIPTION OF PREFERRED EMBODIMENTS

The invention is now described with reference to examples and embodiments.

Figure 1:
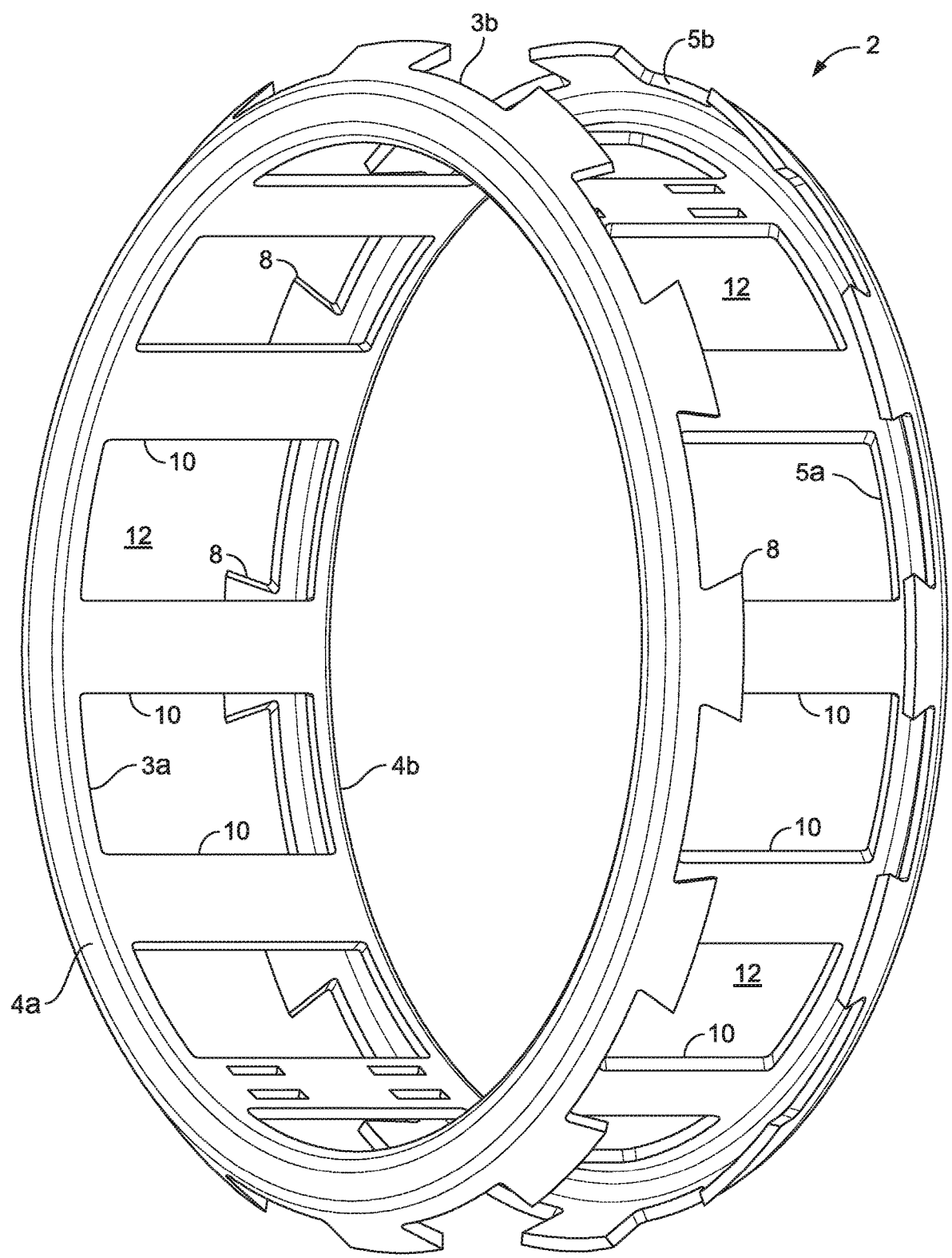
FIG. 1 illustrates an exemplary rolling element bearing cage assembly.

FIG. 1 illustrates an exemplary rolling element bearing cage assembly generally designated by reference numeral 2.

The rolling element bearing cage assembly 2 comprises a first annular ring 4a and a second annular ring 4b. The first and second annular rings are connected together to form a cylindrical-type structure. The first annular ring 4a forms one end of the cylindrical-type structure, and the second annular ring 4b forms the other end of the cylindrical-type structure.

Each annular ring 4a, 4b preferably has an inner circumference and an outer circumference. With reference to FIG. 1, the annular ring 4a has an inner circumference 3a and an outer circumference 3b. The annular ring 4b has an inner circumference 5a and an outer circumference 5b. The inner and outer circumferences are formed by concentric rings of the respective annular ring, with the outer circumference being defined by a larger radius (or diameter) than the inner circumference.

A plurality of retainer portions 10 join the first annular ring 4a to the second annular ring 4b. Each retainer portion 10 has one end connected to the first annular ring 4a at spaced locations around its inner circumference 3a, and the other end connected to the second annular ring 4b at spaced locations around its inner circumference 5a. The plurality of retainer portions 10 are of the same dimensions. Each retainer portion 10 has the same length, and extends by this length from the first annular ring inner circumference 3a to the second annular ring inner circumference 5a, such that the planes of the first and second annular rings 4a, 4b are substantially parallel with each other.

The retainer portions 10 and the first and second annular rings 4a, 4b form a cylindrical-type structure.

The rolling element bearing cage assembly 2 cylindrical-type structure has cylindrical sidewalls formed of the plurality of retainer portions 10. In the sidewalls of the cylindrical-type structure there are provided the plurality of retainer portions 10 each extending from the first annular ring inner circumference to the second annular ring inner circumference 5a. Interspersed with the retainer portions 10 is a plurality of spacer segments 12 which have first and second edges defined by the edges of successive retainer portions 10, and third and fourth edges defined by the inner circumferences 3a, 5a of the first and second annular rings 4a, 4b.

The sidewalls of the cylinder-type structure are thus formed by the retainer portions 10 interspersed alternately with spacer segments 12. The spacer segments 12 are gaps between the retainer portions 10.

Each annular ring 4a, 4b is provided with a plurality of resilient tangs 8 attached to its respective outer circumference 3b, 5b. The first annular ring 4a and the second annular ring 4b are each provided with a plurality of resilient tangs 8 corresponding to the plurality of retainer portions 10. Each resilient tang 8 is located on the first or second annular ring outer circumferences 3b, 5b generally proximate to the connection point of the retainer portion 10. Each resilient tang 8 on the outer circumference 3b of the first annular ring 4a is paired with each tang on the outer circumference 5b of the second annular ring 4b. Resilient tangs 8 positioned at opposite ends of the retainer portion 10 are paired. The number of paired resilient tangs 8 thus corresponds to the number of retainer portions 10.

In the cylindrical-type structure the resilient tangs 8 on each annular ring 4a, 4b are disposed in a direction away from the plane of the annular ring and toward the sidewall of the cylindrical-type structure. This is explained in further detail later.

The spacer segments 12 are for accommodating rolling elements, as discussed further hereinbelow. The dimensions of each spacer segment 12 is configured to accommodate a rolling element.

In the illustration of FIG. 1 the retainer portions are attached at the inner circumference of the annular rings and the tangs are attached at the outer circumference of the annular rings. In alternative arrangements this may be reversed with the retainer portions attached at the outer circumference of the annular rings and the tangs attached at the inner circumference of the annular rings.

In alternatives, a single element may provide a retainer portion and a pair of opposing tangs. For example, a retainer portion may join the annular rings, and the tangs protrude from the retainer portion.

Figure 2:
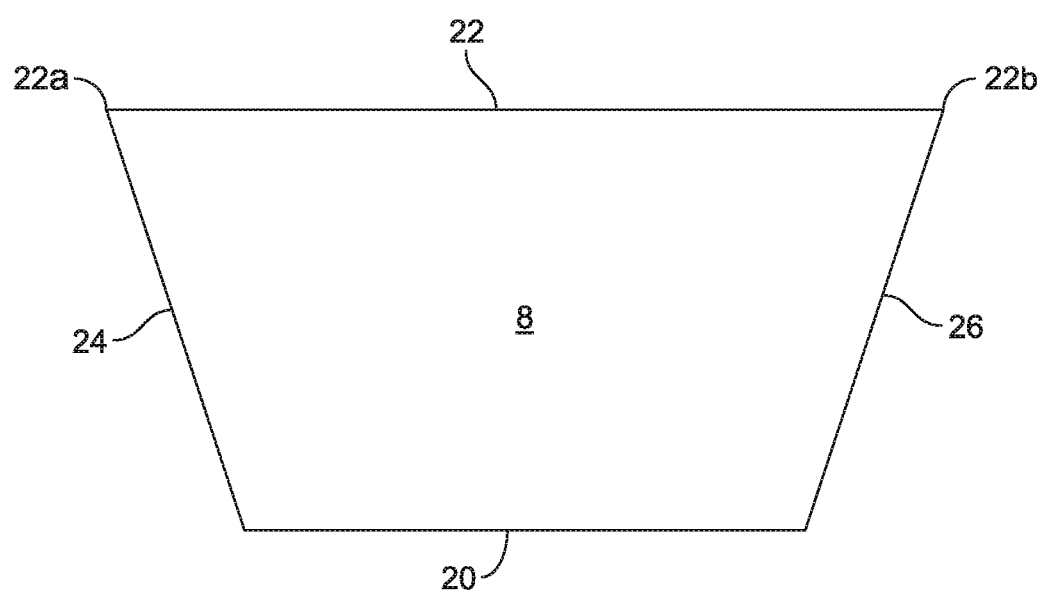
FIG. 2 illustrates an exemplary resilient tang of the rolling element bearing cage assembly of FIG. 1.

With reference to FIG. 2 there is shown in further detail the structure of an exemplary resilient tang 8. Each resilient tang 8 has a first tang edge 20, a second tang edge 22, a third tang edge 24, and a fourth tang edge 26.

The first tang edge 20 may be connected to a respective outer circumference 3b, 5b of the first or second annular rings 4a, 4b. The second tang edge 22 is substantially parallel to the first tang edge 20, although the disposition of the resilient tangs on the respective annular rings may, in situ, distort this parallel relationship. This distortion may be as a result of the curved nature of the annular rings. The first tang edge 20 has a shorter length than the second tang edge 22.

The third and fourth tang edges 24 and 26 are of the same length, and connect the ends of the first tang edge 20 to the ends of the second tang edge 22.

The ends of the second tang edge 22 are identified by reference numerals 22a and 22b and are referred to as second tang edge ends.

The purpose of the tangs is to assist in securely positioning a rolling element in a spacer segment, as will be discussed further below. The first tang edge 20 is connected to the first or second annular ring outer circumference, and the second tang edge ends 22a, 22b engage a rolling element positioned in a spacer segment. Alternatively or in addition, the third 24 and fourth 26 tang edges may engage a rolling element positioned in a spacer segment.

Figure 3:
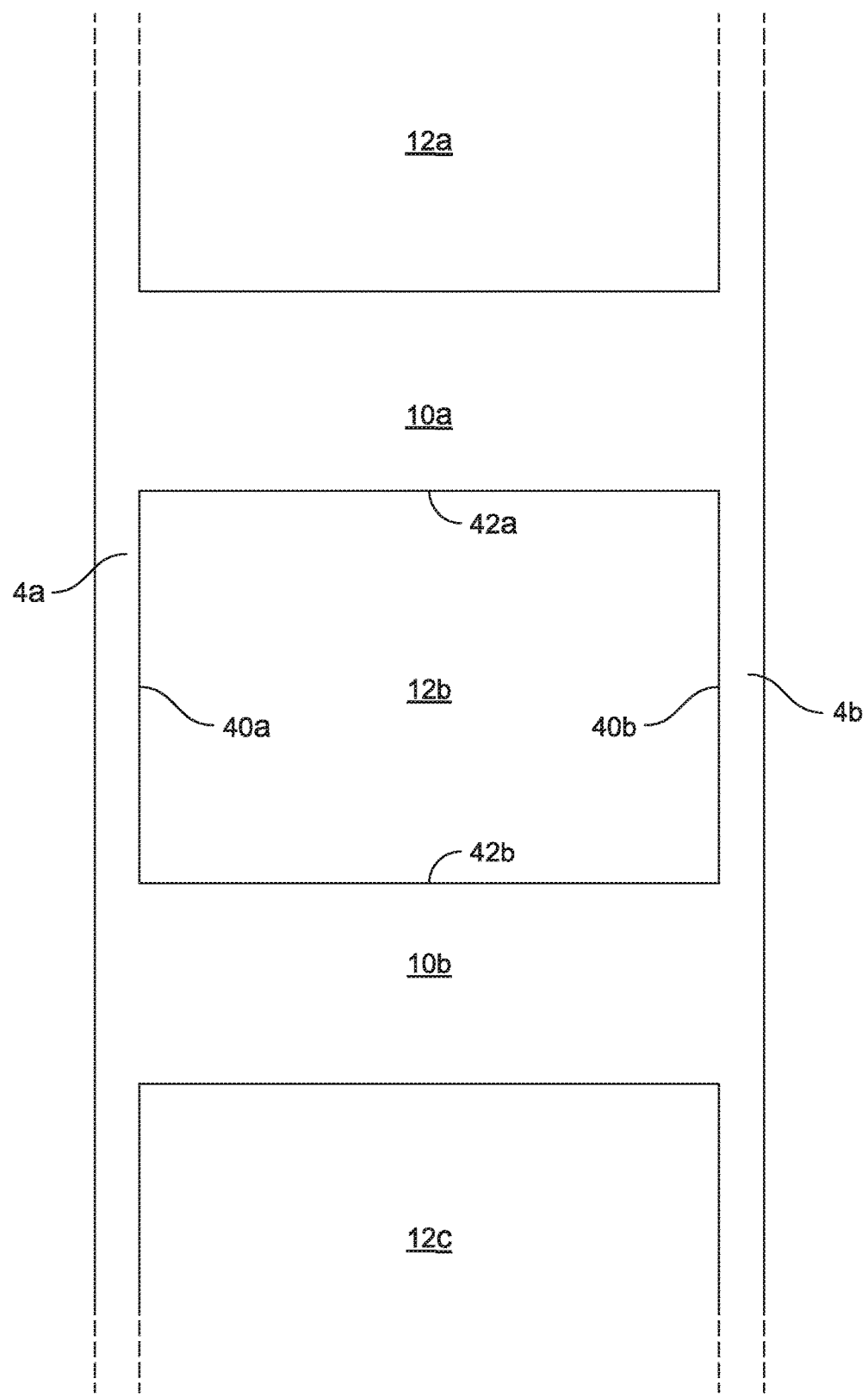
FIG. 3 illustrates a view of the exemplary rolling element bearing cage assembly of FIG. 1, without tangs.

FIG. 3 illustrates the structure of the sidewalls of the cylinder-type rolling element bearing cage assembly in more detail, but for ease of illustration without the tangs. FIG. 3 illustrates the sidewall as a flat, elongated element for ease of reference. In practice this element is curved or bent in order to provide the sidewall structure as shown in FIG. 1.

Shown in FIG. 3 is: a portion of the first annular ring 4a; a portion of the second annular ring 4b; two retainer portions 10a, 10b which connect the first and second annular ring inner circumferences 3a, 5a, and form part of the sidewall of the cylindrical-type structure; a spacer segment 12b; and portions of two further spacer segments 12a, 12c.

The spacer segment 12b is provided between the two retainer portions 10a and 10b. In general the sidewall of the cylindrical-type structure comprises a plurality of retainer portions interspersed with a plurality of spacer segments 12.

The spacer segment 12b has a first pair of opposing walls 42a, 42b defined by the edges of the adjacent retainer portions 10a, 10b, and a second pair of opposing walls 40a, 40b defined by the segments of the first 4a and second 4b annular ring inner circumferences respectively. In general the spacer segments 12 define an area of space between the retainers 10 and between the first 4a and second 4b annular rings to accommodate rolling elements as discussed below.

Figure 4:
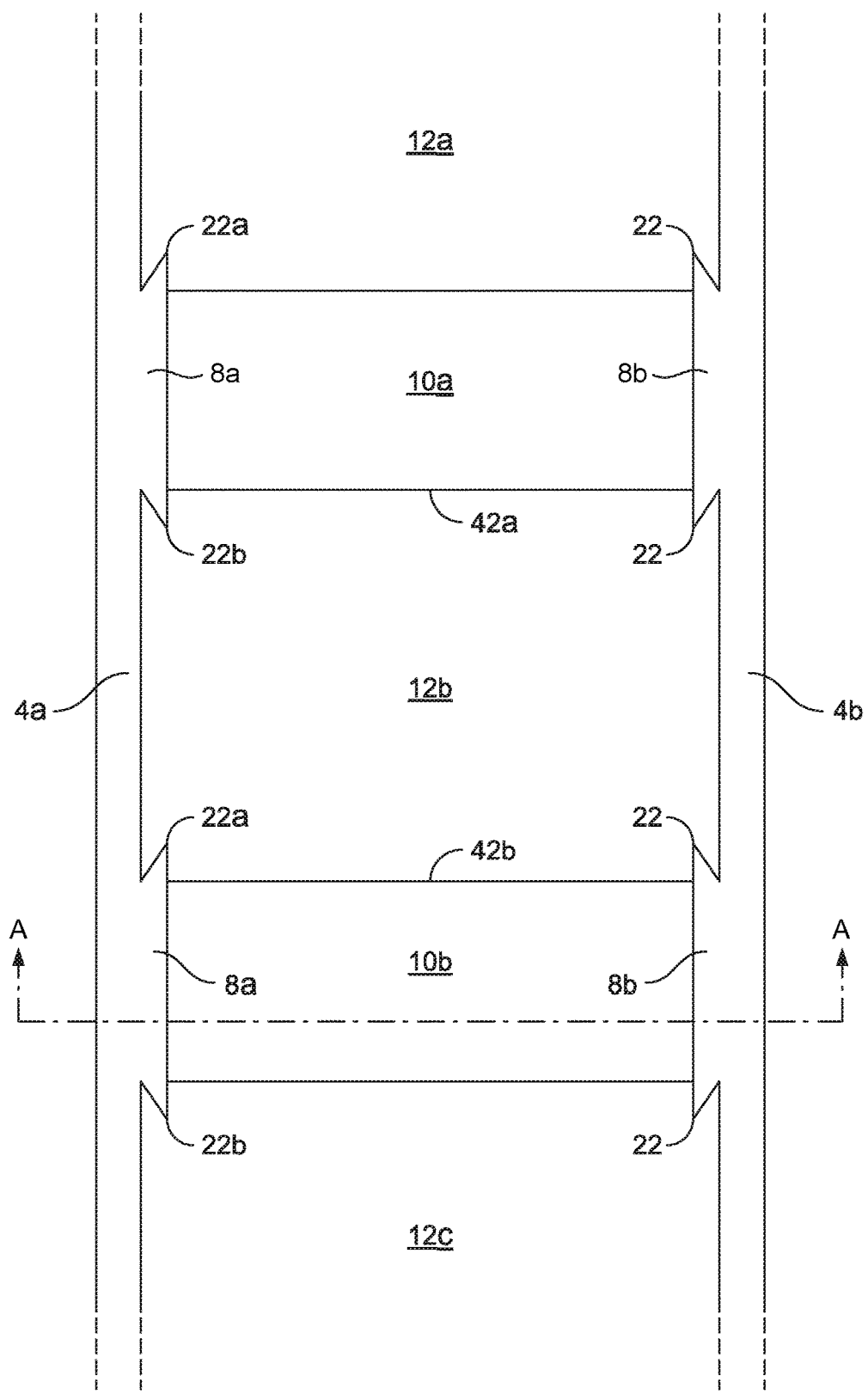
FIG. 4 illustrates the exemplary view of FIG. 3 with the tangs included.

FIG. 4 illustrates the structure of the cylinder sidewalls of the rolling element bearing cage assembly as shown in FIG. 3, but further expanded to include the resilient tangs 8.

As shown in FIG. 4, resilient tang pairs are labelled by reference numerals 8a, 8b. The resilient tangs are disposed to point inwardly of the cylindrical-type structure. This inward disposition means that the tangs extend toward a direction along the sidewalls, but external to the internal cylindrical-type structure.

In FIG. 4 the second tang edge ends 22a, 22b are denoted.

Figure 5:
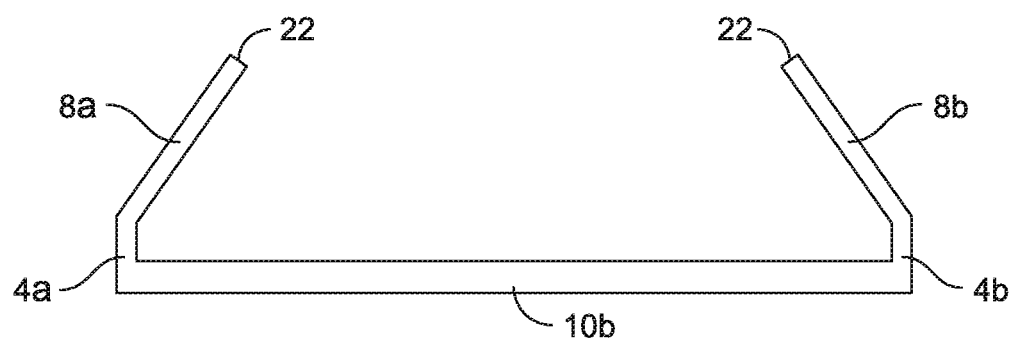
FIG. 5 illustrates a view through a cross-section of FIG. 4.

The formation of the resilient tangs 8 is further illustrated by FIG. 5, which shows a cross-section through FIG. 4 along the dashed line denoted by A-A.

As shown in FIG. 5, the resilient tangs 8a, 8b extend from the respective annular rings 4a and 4b. The annular rings are joined by the retainer 10b. The resilient tangs 8 are connected to the annular rings 4a, 4b at a position proximate to where the retainer portions 10 are connected to the annular rings 4a, 4b. The resilient tangs are connected to the annular rings outer circumference 3b, 5b, along the first resilient tang edge 20.

The retainer portions 10 are for positioning and retaining rolling elements within the space segments 12, and the second tang edge ends 22a, 22b are utilised for retaining rolling elements in the space segments. As noted above, the third 24 and fourth 26 tang edges may alternatively or additionally be used for retaining the rolling elements.

The dimensions of the space segments 12 between the first and second annular rings is determined in order to accommodate required rolling elements. The second tang edge ends 22a, 22b of the resilient tangs 8 are also provided to retain required rolling elements within the space segments, and the tangs 8 are thus appropriately shaped and dimensioned to permit this. When used to retain the rolling elements, the third 24 and fourth 26 tang edges may be appropriately shaped.

Figure 6:
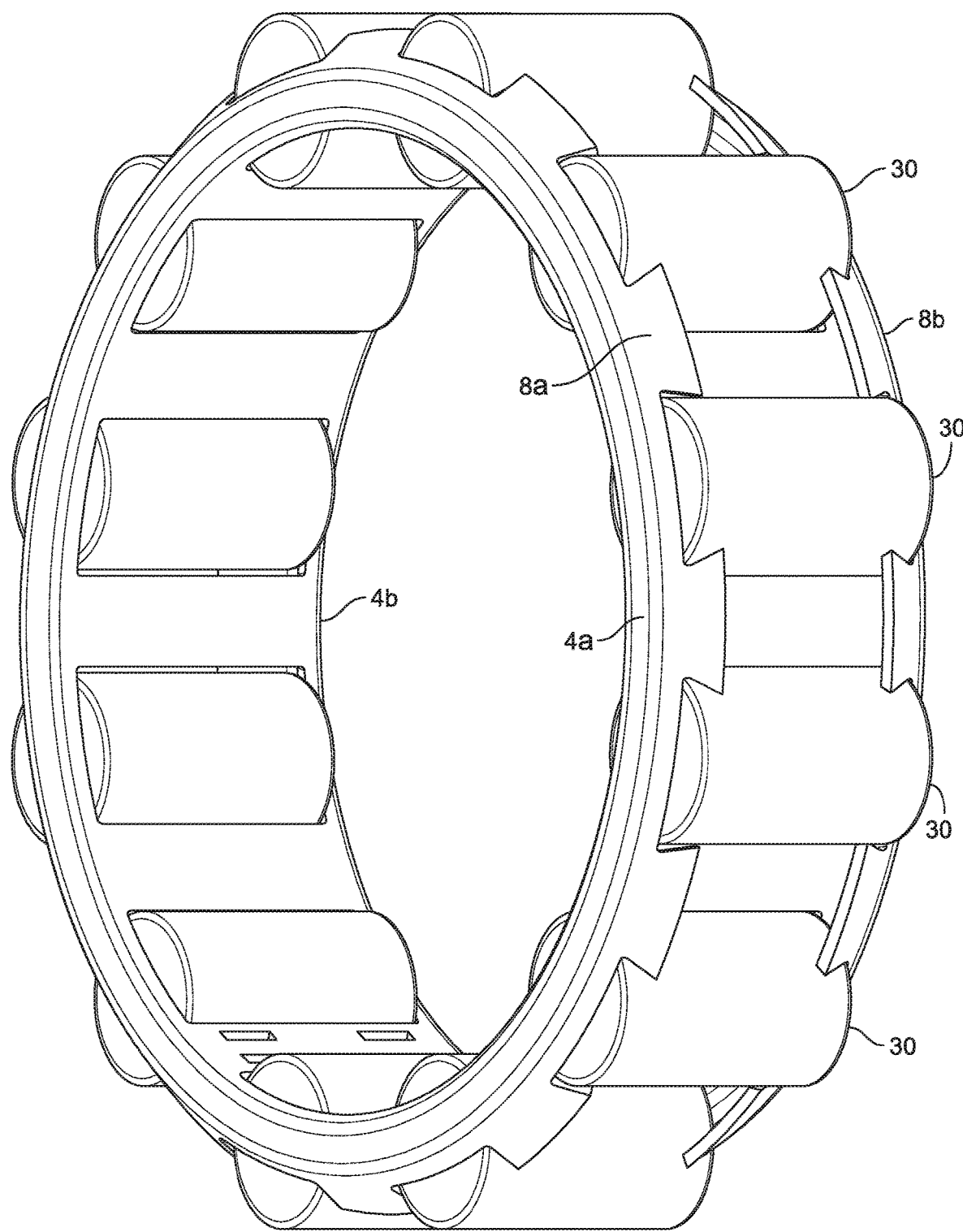
FIG. 6 illustrates the exemplary rolling element bearing cage assembly of FIG. 1 with rolling elements.

With reference to FIG. 6, there is shown the exemplary rolling element bearing cage assembly of FIG. 1 with rolling elements positioned therein. A plurality of rolling elements are provided, generally designated by reference numeral 30, with each rolling element being located within a space segment 12.

Figure 7A:
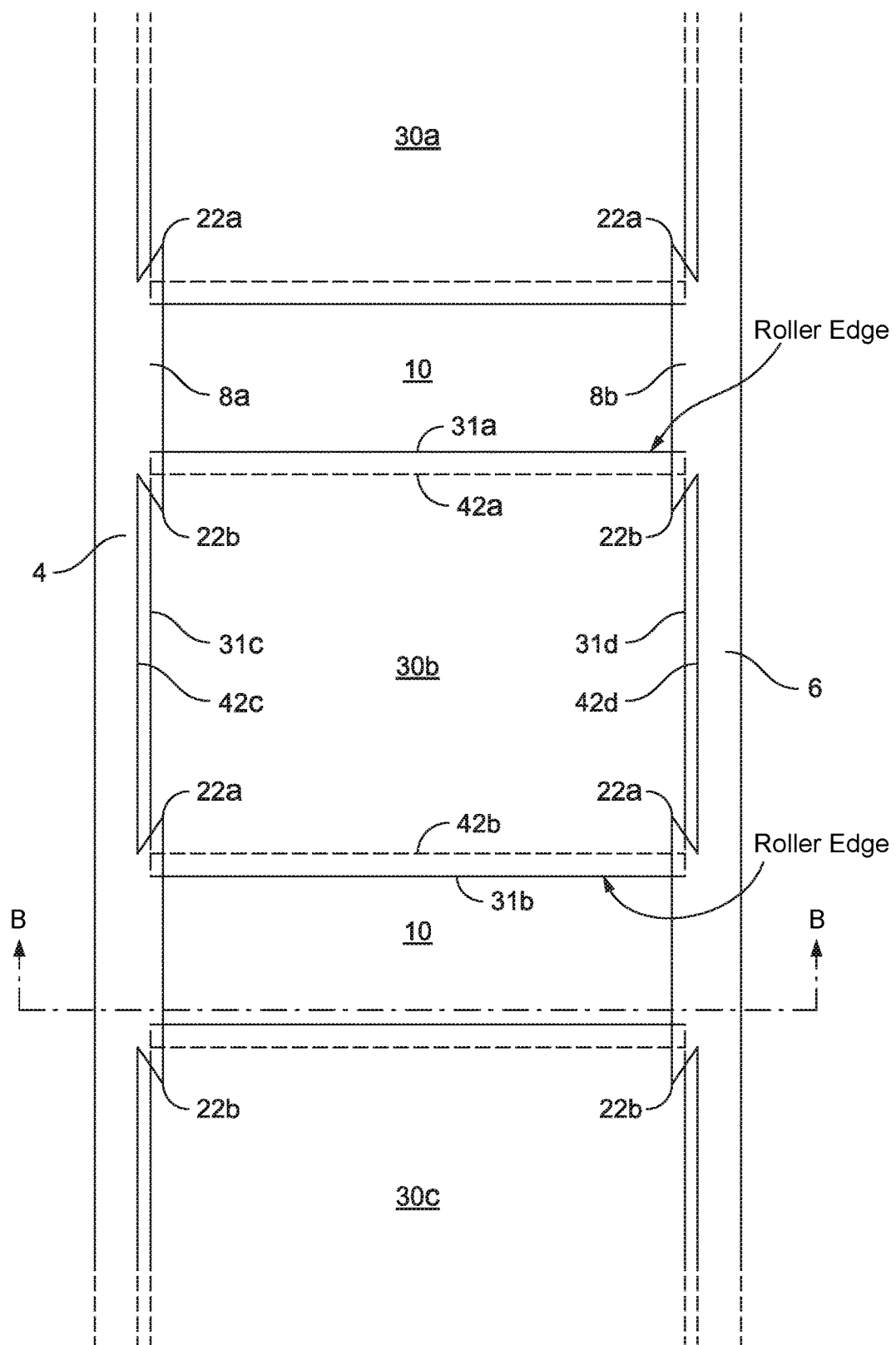
FIGS. 7A, 7E, and 7C illustrate views of the exemplary rolling element bearing cage assembly of FIG. 6, with tangs included.
Figure 7B:
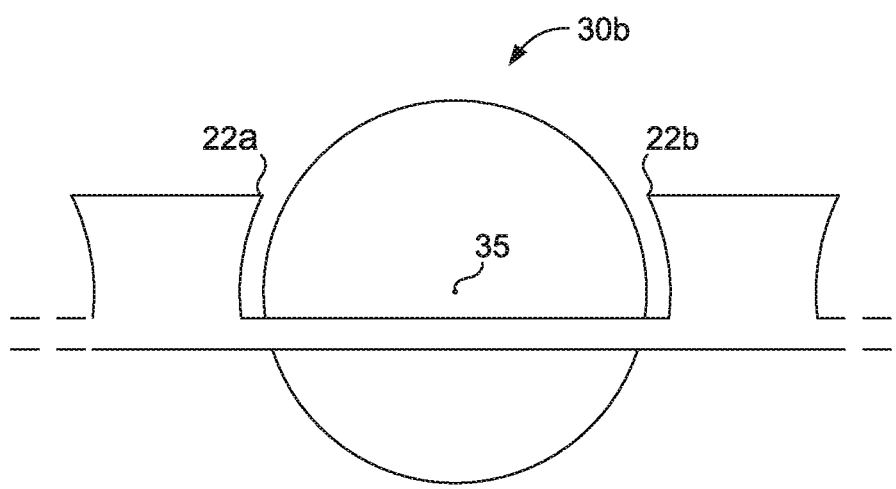

FIG. 7A illustrates the structure of the cylinder sidewalls of the rolling element bearing cage assembly as shown in FIG. 4, but further expanded to include the rolling elements 30. Each rolling element 30 occupies a space segment 12. As with FIG. 4, this illustrates a view from above. FIG. 7B illustrates a side view of FIG. 7A. With reference to FIGS. 7A and 7B, like reference numerals are used for elements which correspond to FIG. 4.

A rolling element 30b is located within the space segment 12b. Also shown are portions of a rolling element 30a located in space segment 12a, and rolling element 30c located within space segment 12c. The rolling element 30b as illustrated in FIG. 7A has first and second edges 31a, 31b alongside first and second edges 42a, 42b of the spacer segment. The rolling element 30b as illustrated in FIG. 7A also has third and fourth edges 31c, 31d alongside the first and second edges 42c, 42d of the space segment.

As shown in the sideview of FIG. 7B, the rolling element 30b is positioned such that the annular rings do not intersect the central point 35 of the rolling element 32b.

The location of rolling element 30b in a space segment 12b leaves spaces along the edges of the rolling element within the space segment 12b. Similarly for all rolling elements there is such space along the edges within the space segment they are positioned. This space allows the rolling elements 30 to rotate as necessary. The rolling elements are not fixably positioned in the space segments. The drawings are not to scale, and the spaces shown do not represent actual dimensions. A rolling element may in fact move about the edges of the space segment 12 within which it is positioned.

In FIGS. 7A and 7B the second tang edge ends 22a, 22b are denoted. The second tang edge ends 22a, 22b each abut a rolling element surface in the space segment 12 adjacent a retainer portion 10.

A rolling element such as rolling element 30b may be held in the space segment 12b by the resilient tangs 8. The second tang edge ends 22a, 22b prevent the rolling element 32b moving upwards (with reference to the illustration of FIG. 7B, and the space segment dimensions prevent the rolling element 32b moving downwards. The distance between adjacent retainer portions is less than the rolling element diameter. The rolling element 32b is thus held in position.

Figure 7C:
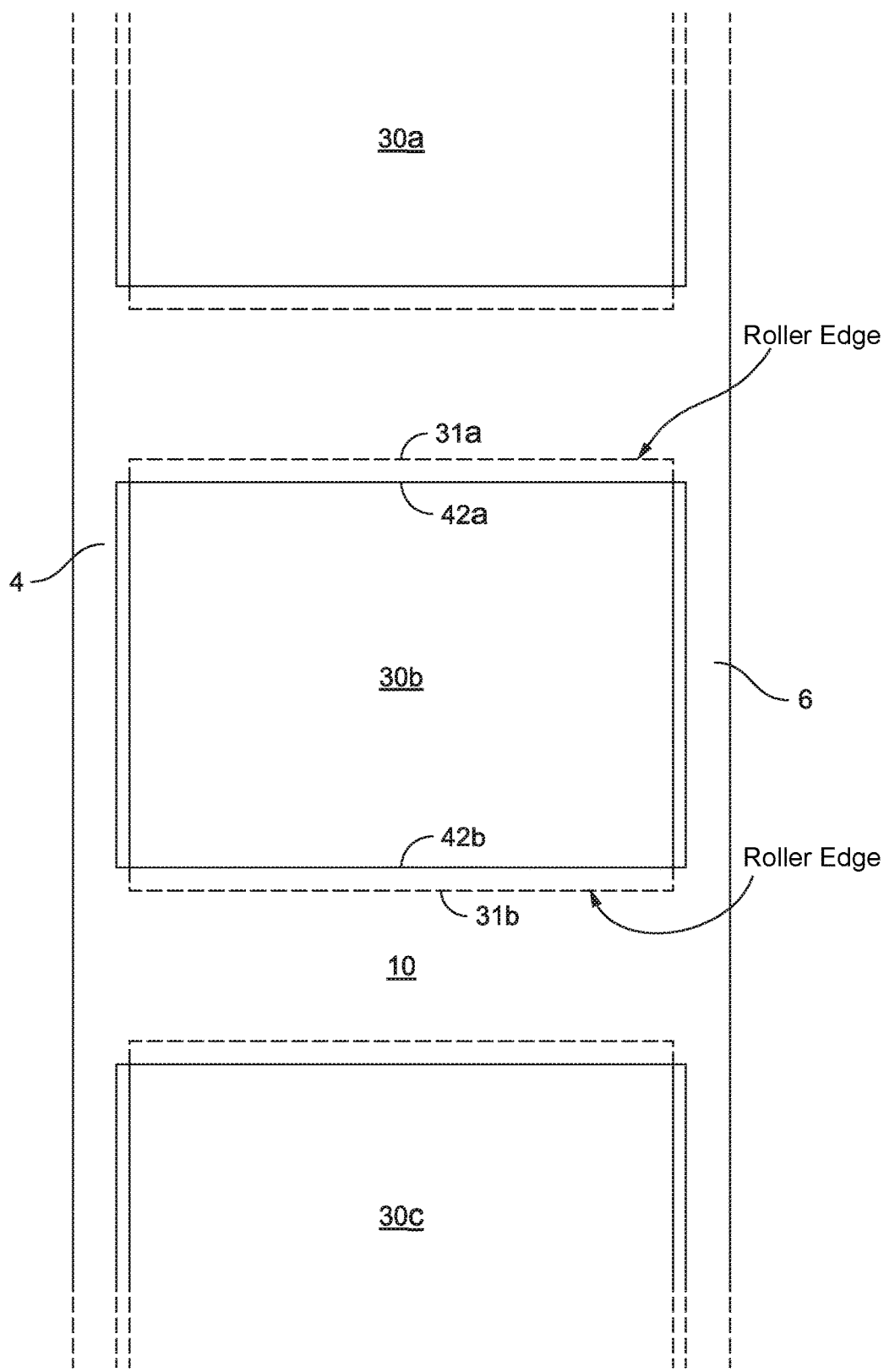

For completeness FIG. 7C illustrates a view of the arrangement of FIG. 7A from below.

Figure 8:
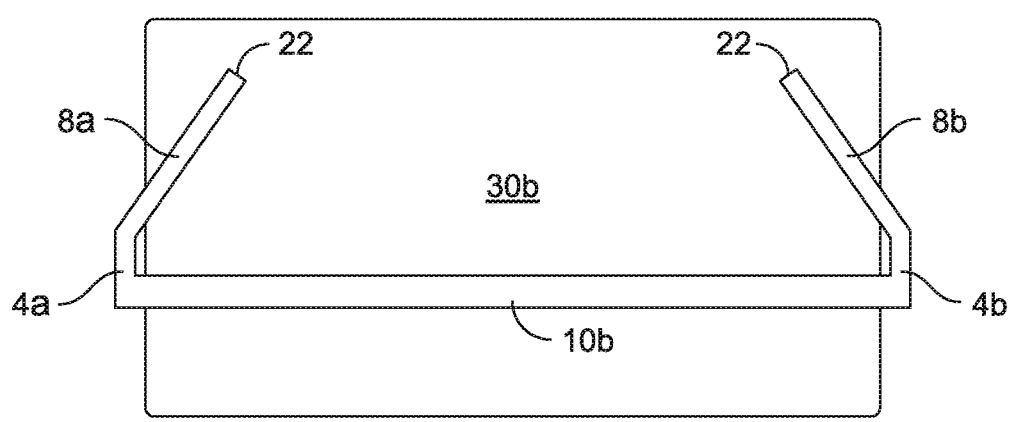
FIG. 8 illustrates a view through a cross-section of FIG. 7A.

The formation of the resilient tangs 8 is further illustrated by FIG. 8, which shows a cross-section through FIG. 7A along the dashed line denoted by B-B. FIG. 8 corresponds to FIG. 5, but with a rolling element in situ.

As shown in FIG. 8, the resilient tangs 8a, 8b extend from the respective annular rings 4a and 4b. The annular rings inner circumferences are joined by the retainer portion 10b. The resilient tangs 8 are connected to the annular rings outer circumferences at a position proximate to where the retainer portions are connected to the annular ring inner circumferences. The resilient tangs are connected to the annular rings along the first tang edge 20. The rolling element 30b is shown in FIG. 8.

As noted above with reference to FIG. 5, the dimension of the space segments 12 between the first and second annular rings is determined in order to accommodate required rolling elements. The dimensions of the retainer portions 10 between adjacent retainer portions is also determined in order to accommodate required rolling elements. The second tang edge ends 22a, 22b of the tangs 8 are also provided to retain required rolling elements within the space segment, and the tangs are thus appropriately shaped and dimensioned to permit this. The shaping and dimensioning of the tangs in order to achieve this comprises determining the length of the second tang edge 22, and determining the angle at which the tang should be disposed to extend from the annular ring.

Figure 9A:
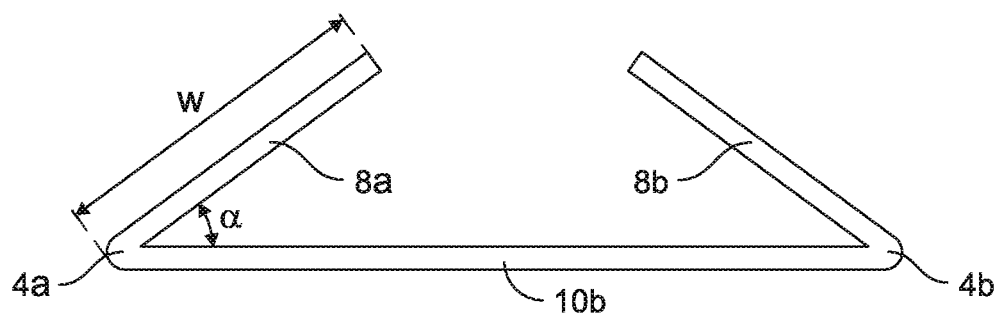
FIGS. 9A and 9B illustrate an exemplary tang.
Figure 9B:
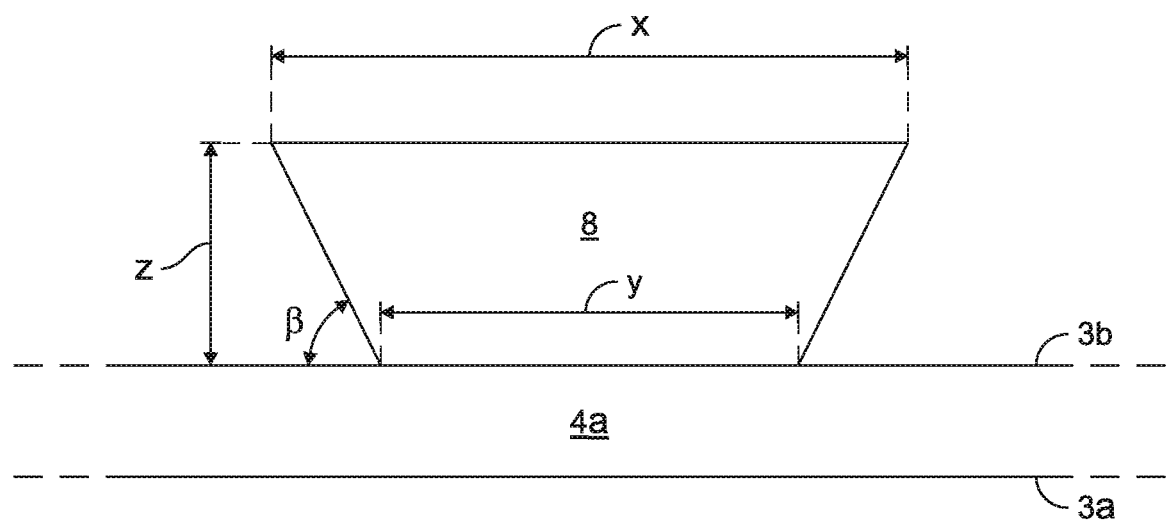

With reference to FIGS. 9A and 9B, there is illustrated two representations of the tang in respect of which dimensions and angles associated with the tang for retaining a rolling element in place can be understood.

FIG. 9A provides a view which corresponds to FIG. 5, showing a pair of tangs 8a, 8b, the annular rings 4a, 4b, and the retainer portion 10b.

FIG. 9B shows a view corresponding to FIG. 2, but showing the tang 8 positioned in connection to the annular ring 4a.

As shown in FIG. 9A, the tang 8 extends from the annular ring 4a by a length dimension w, and extends at an angle $\alpha$ relative to the retainer portion 10b. The dimension w extends from the outer circumference of the annular rings to the second tang edge.

As shown in FIG. 9B, the first edge of the tang has a dimension y, the second edge of the tang has a dimension x, the first and second edges of the tang are separated by a radial distance z. The dimension z is the vertical height of the tang over the outer circumference of the annular ring. It is not the physical length of the third and fourth tang edges.

The second edge of the tang is longer than the first edge of the tang (x>y) such that the third tang edge (viewed radially) which extends from the first tang edge and to the second tang edge end, extends by an angle β.

Figure 10:
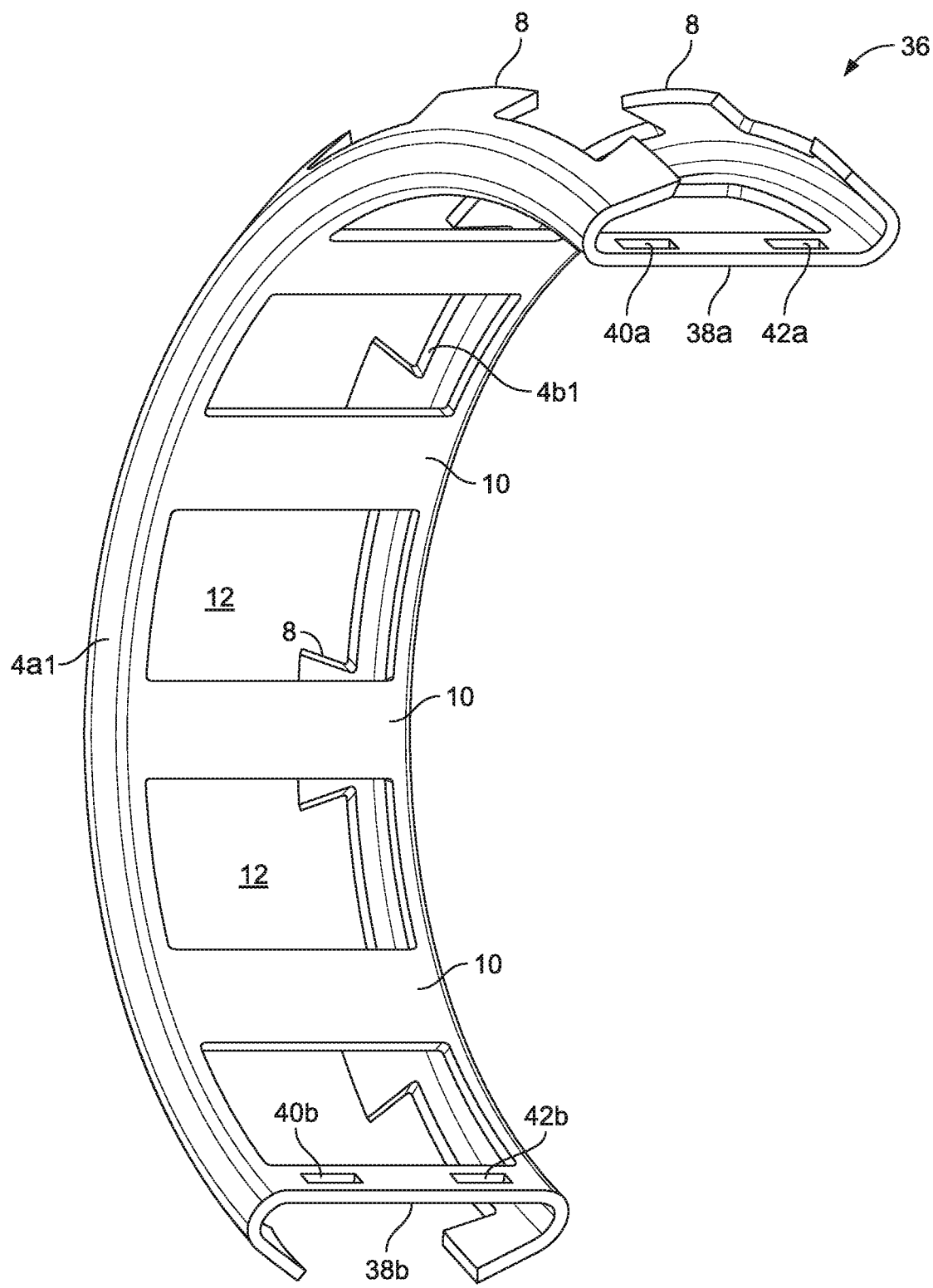
FIG. 10 is a view of an exemplary half rolling element bearing cage assembly.

With reference to FIG. 10, there is illustrated half of the exemplary rolling element bearing cage assembly of FIG. 1, which is generally designated by reference numeral 36. Consistent with FIG. 1, there is shown a first half of the first annular ring 4a denoted by reference numeral 4a1, a first half of a second annular ring 4b denoted by reference numeral ring 4b1. A plurality of retainer portions 10 are shown, and a plurality of space segments 12 are shown. A plurality of tangs 8 are also shown.

In the half rolling element bearing cage assembly 36 of FIG. 10, there is shown two ends denoted by reference numerals 38a and 38b. Each end comprises the rolling element bearing cage being terminated at a half retainer portion, which reference numerals 38a and 38b denote. The half rolling element bearing cage assembly shown in FIG. 10 may be matched with another half rolling element bearing cage assembly, and on connecting together each half terminates with half of a retainer portion 38a, 38b which can be joined together to form a whole retainer portion.

As also shown in FIG. 10, the half of the retainer portion 38a comprises two slots 40a and 42a, and the half of the retainer portion 38b comprises two slots 40b and 42b. These slots on each half of the retainer portion can engage with a connector, to allow two halves of a rolling element bearing cage to be joined together.

Figure 11:
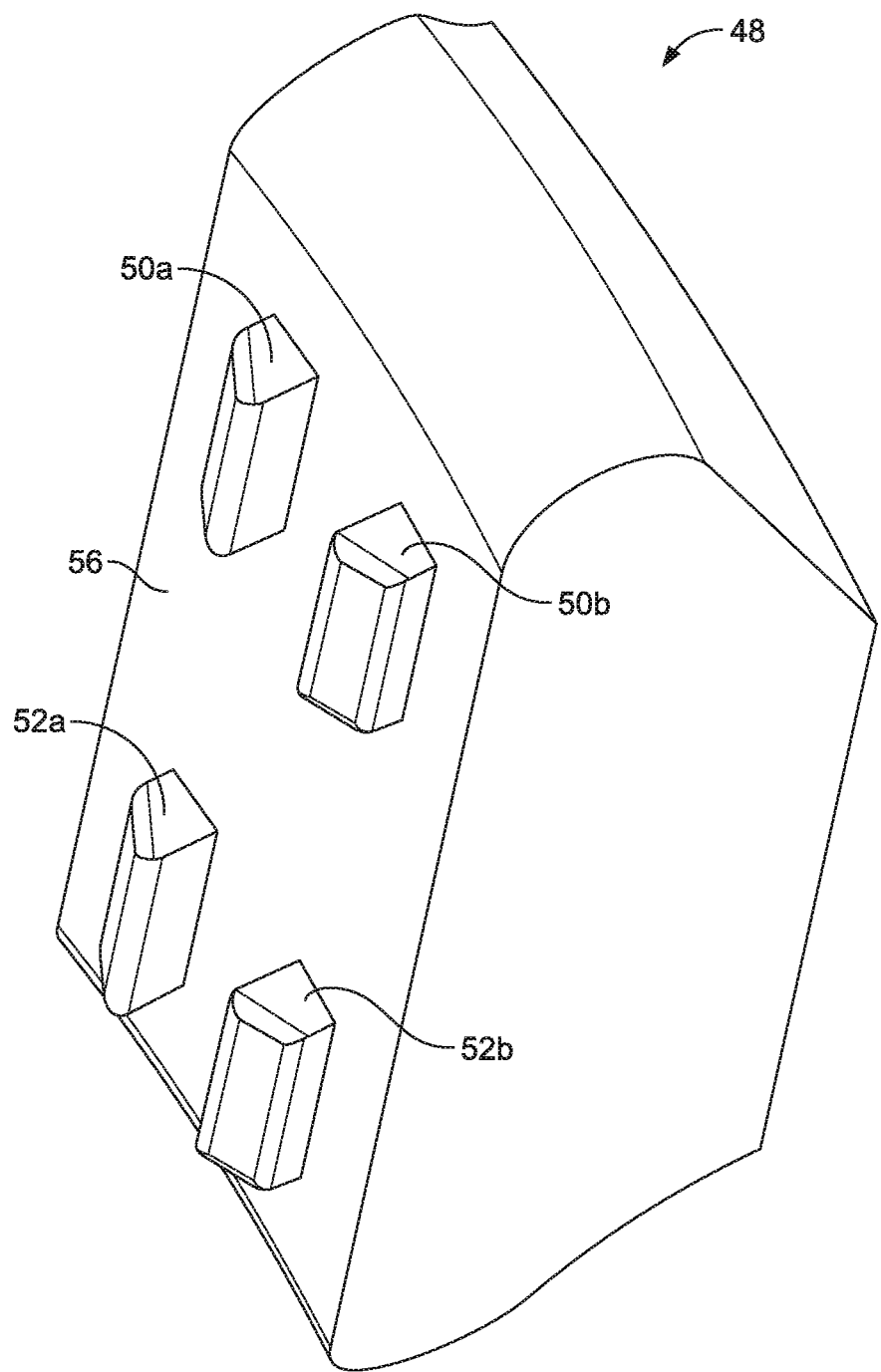
FIG. 11 is a view of an exemplary connector for connecting two half rolling element bearing cage assemblies.

FIG. 11 illustrates an exemplary connector for joining two rolling element bearing cage assembly halves as illustrated in FIG. 10. A connector generally designated by reference numeral 48 has four engagement protrusions 50a, Sob, 52a, 52b on a surface 56 thereof. Two connectors 48 are required to connect two rolling element bearing cage assembly halves.

The surface 56 is provided to interface with a surface of the retainer portion. The protrusions 50a and 52a are provided to engage with the slots 40a and 42a, and the protrusions 50b and 52b are arranged to engage with the slots 40b and 42b respectively. In this way a connector 48 can be used at each location 38a, 38b to connect the two rolling element bearing cage assembly halves together.

The connector 48 is shaped in order to fit into the space available above the retainer portions comprised of the two half retainer portions 38a, 38b. The connector 48 therefore preferably has a profile to allow it to be accommodated within the space available between the retainer portions and the associated two half tang pairs.

Figure 12:
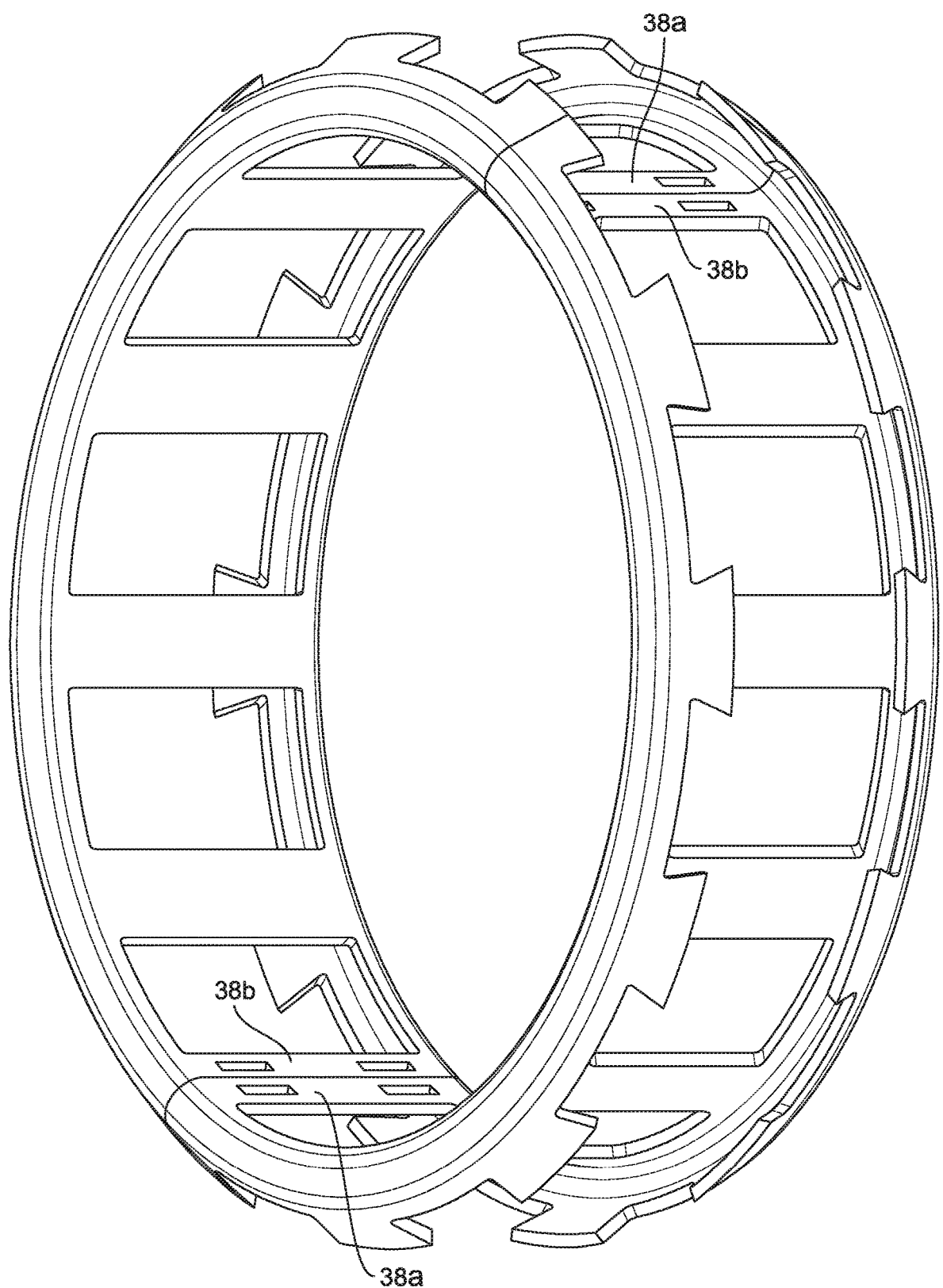
FIG. 12 illustrates an exemplary rolling element bearing cage assembly comprising two halves of a rolling element bearing cage assembly connected together.

FIG. 12 illustrates an arrangement in which two rolling element bearing cage assembly halves such as shown in FIG. 10 have been joined together. For ease of illustration the joining together before the fixing of the connector 48 is illustrated.

As shown, the half retainer portion 38a is joined to another half retainer portion 38b of another rolling element bearing cage assembly half. Similarly the other half retainer portion 38b is joined to another half retainer portion 38a.

FIGS. 10 to 12 illustrate how two rolling element bearing cage assembly halves, once formed, may be connected together to form a whole rolling element bearing cage assembly.

It should be noted that this description sets forth an example where the rolling element bearing cage assembly is made of two halves, where the rolling element bearing cage is formed of multiple segments, it may be formed of two or more segments, and the segments are not limited to being halves.

Figure 13:
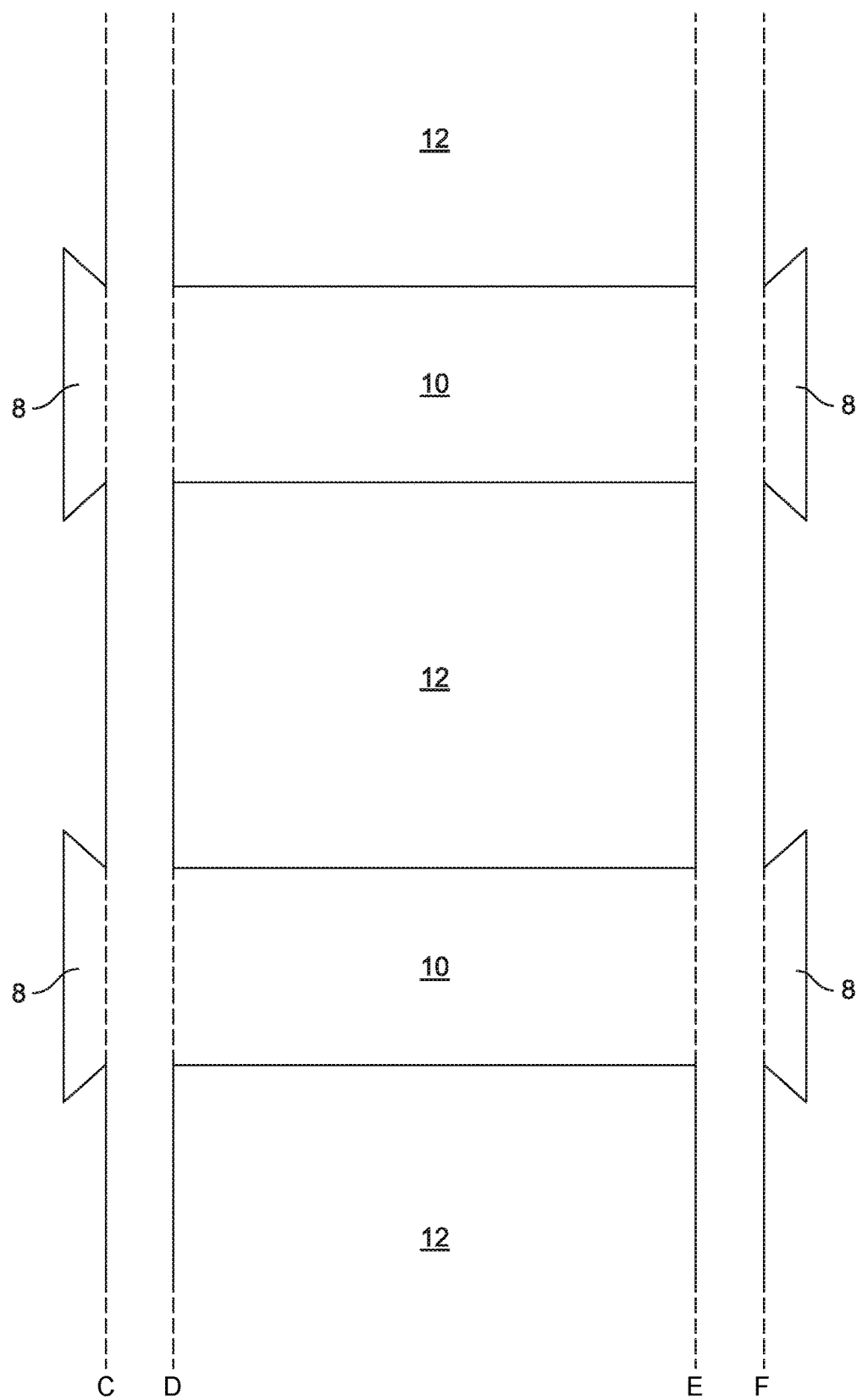
FIG. 13 illustrates an exemplary planar strip informing the rolling element bearing cage assembly with tangs during fabrication.
Figure 14:
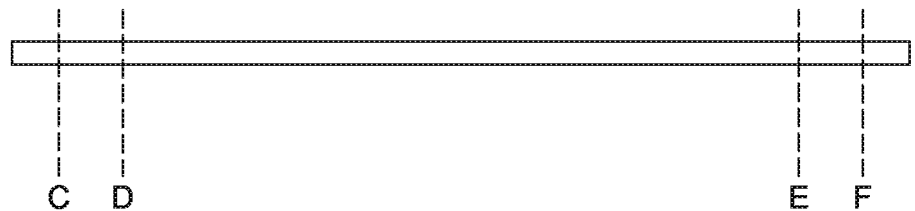
FIG. 14 illustrates a cross-sectional view of the rolling element bearing cage assembly of FIG. 13 during fabrication.
Figure 15:
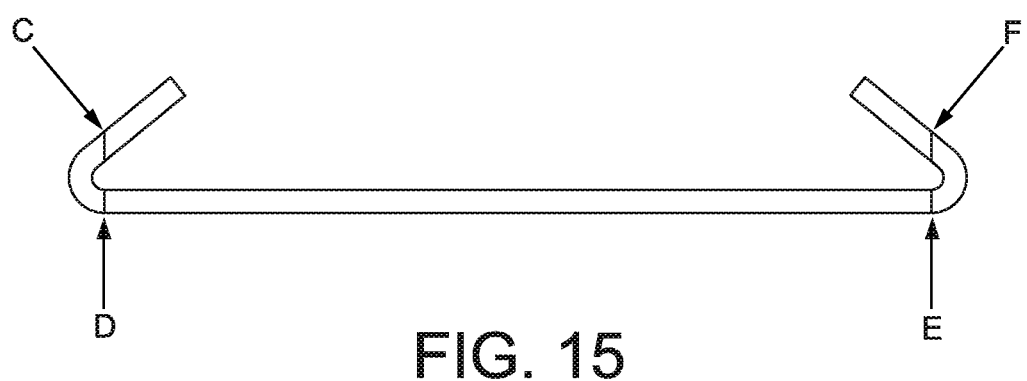
FIG. 15 illustrates an alternate view of the rolling element bearing cage assembly of FIGS. 13 and 14 after the material has been formed.

With reference to FIGS. 13 to 15, there is illustrated an example of how each half of the rolling element bearing cage assembly may be formed.

FIG. 13 illustrates a sheet of material, such as a metal material, which may be formed to have the shown shape with the tang shapes protruding from the edge thereof. Also shown are the space segments 12 which may be stamped or machined out from the material.

Shown in FIG. 13 are dashed lines labelled C, D, E, and F. FIG. 14 shows the material of FIG. 13 from a different angle, which shows the planar structure of the material. Also shown are the dashed line C, D, E, and F in relation to this view.

The structure as shown in FIG. 13 is first rolled into a half cylinder shape, and then formed along the then curved lines C, D, E and F to form the sectional shape as shown in FIG. 15—to arrive at the curved rolling element bearing cage half structure as shown in FIG. 10. The points associated with dashed lines C, D, E and F are shown in FIG. 15.

The structure as shown in FIG. 15 is then bent, to arrive at the curved structure such as shown in FIG. 1.

Whilst the lines C and D, E and F are shown as aligned in FIG. 15, the illustration is merely to show where the retainer portions end, the annular rings start, and where the tangs begin.

Figure 16:
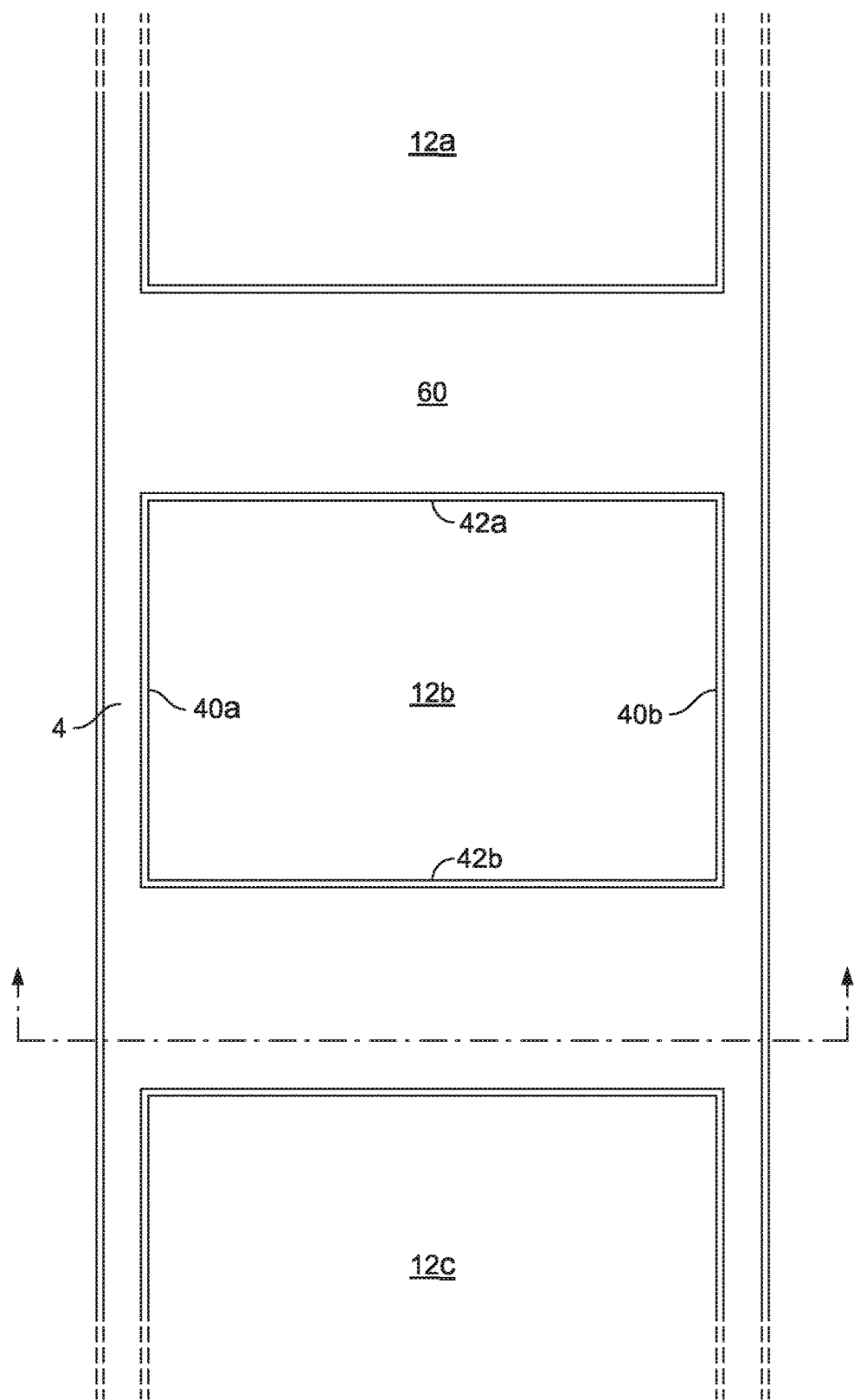
FIG. 16 illustrates a view of an exemplary rolling element bearing cage assembly without tangs and with an additional supporting material corresponding to the arrangement of FIG. 3 but with additional supporting material.

With reference to FIG. 16, there is shown a further arrangement in which a second material is used for the formation of part of the rolling element bearing cage assembly.

FIG. 16 illustrates a rolling element bearing cage assembly similar to FIG. 3, but an additional piece of material 60 is provided. As with FIG. 3, the resilient tangs 8 are omitted for ease of illustration.

The additional material may be provided on top of the retainer portion segments of the rolling element bearing cage structure or sandwiched within the retainer portion segments. The material is provided as a single layer of material 60.

Figure 17A:
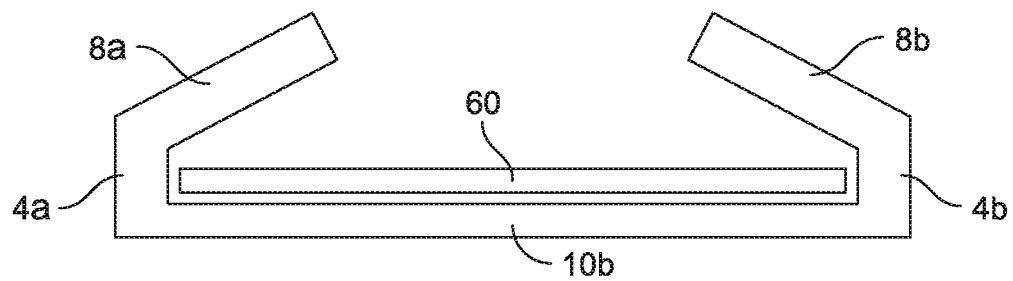
FIGS. 17A and 17B illustrates alternate views through a cross-section of FIG. 16 in two different arrangements.

In an example of FIG. 16, this material 60 is provided on top of the retainer portion segments. FIG. 17A shows a cut-through section G-G of FIG. 16, although in FIG. 17A the tangs 8, not shown in FIG. 16 for ease of illustration, are also shown. FIG. 17A thus corresponds to FIG. 5.

The additional material 60 is shown in FIG. 17A, which it can be seen is formed within the rolling element bearing cage structure previously defined. The rolling element bearing cage assembly can thus be formed with the two component parts being formed together.

Figure 17B:
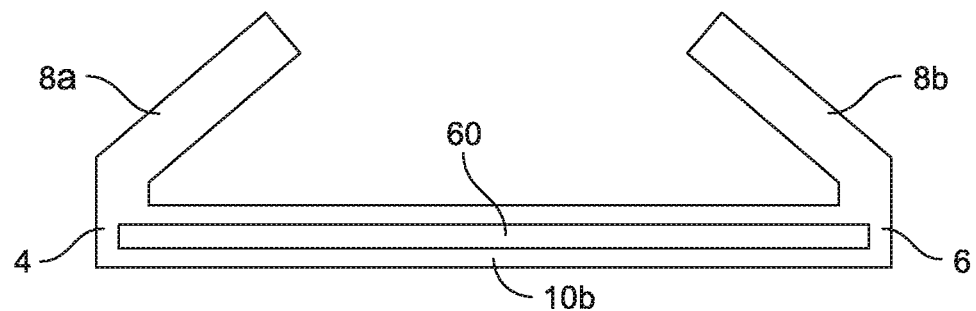

FIG. 17B illustrates the alternative arrangement in which the material 60 is sandwiched within the retainer portion 10.

In general the rolling element bearing cage assembly may be enhanced or strengthened by the provision of the additional material, and the formation of the additional material will depend on the formation of the rolling element bearing cage assembly.

Figure 18:
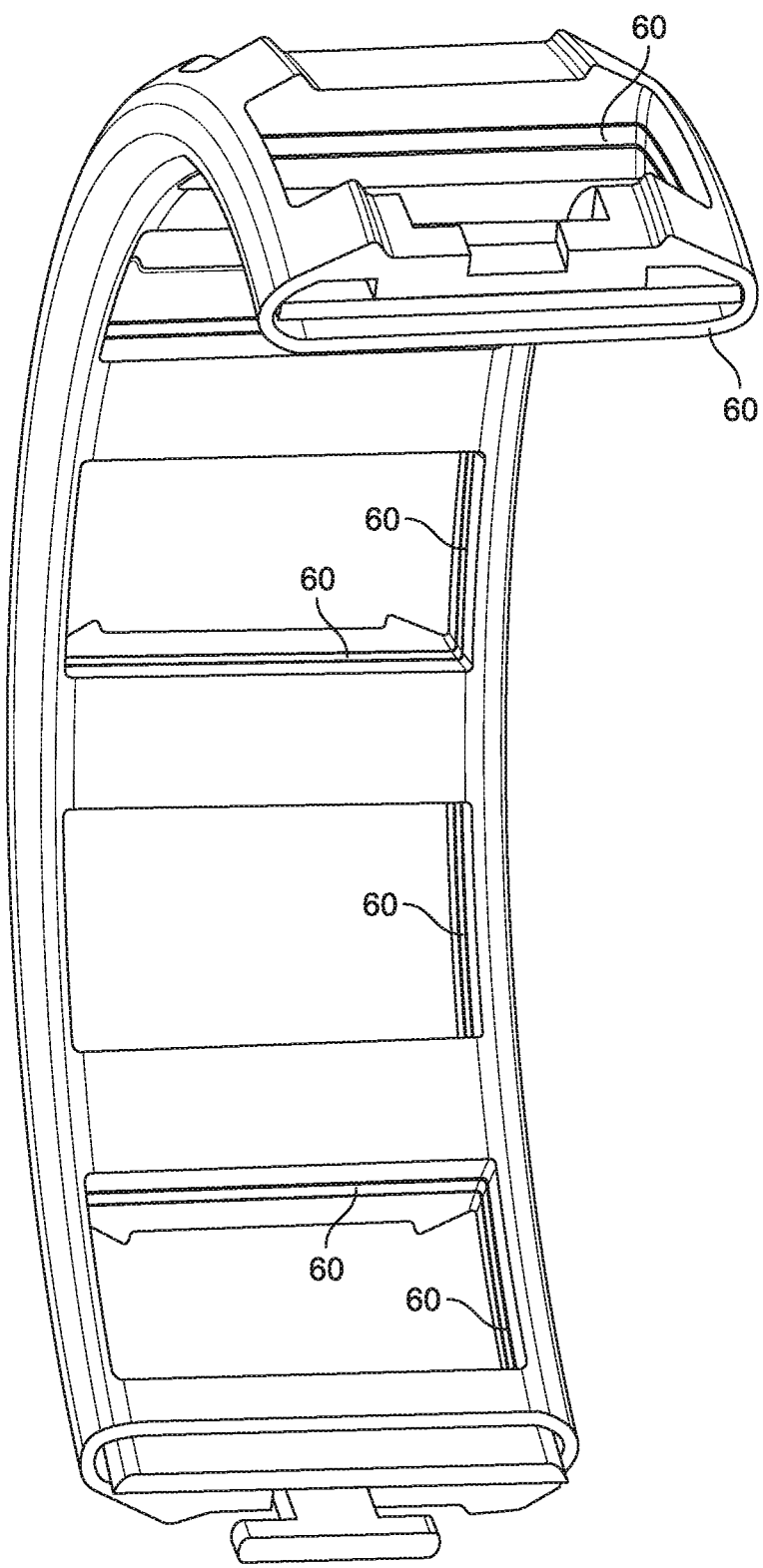
FIG. 18 illustrates a rolling element bearing cage assembly according to FIGS. 16 and 17.

FIG. 18 shows a half of an exemplary rolling element bearing cage assembly, a similar view to that of FIG. 10, with the material 60 included. The rolling element bearing cage assembly of FIG. 18 includes the additional material, and also shows that opposing resilient tangs are joined together by an integrated further retainer portion. The area between each retainer portion and an associated joined pair of opposing tangs may be largely or completely filled. This may simplify the manufacturing process, and/or may enhance the robustness of the rolling element bearing cage assembly.

As such, whether the additional material is placed on top of the retainer portions or sandwiched within the retainer portions is not important, as the additional material may become sandwiched merely by filling the area.

Figure 19:
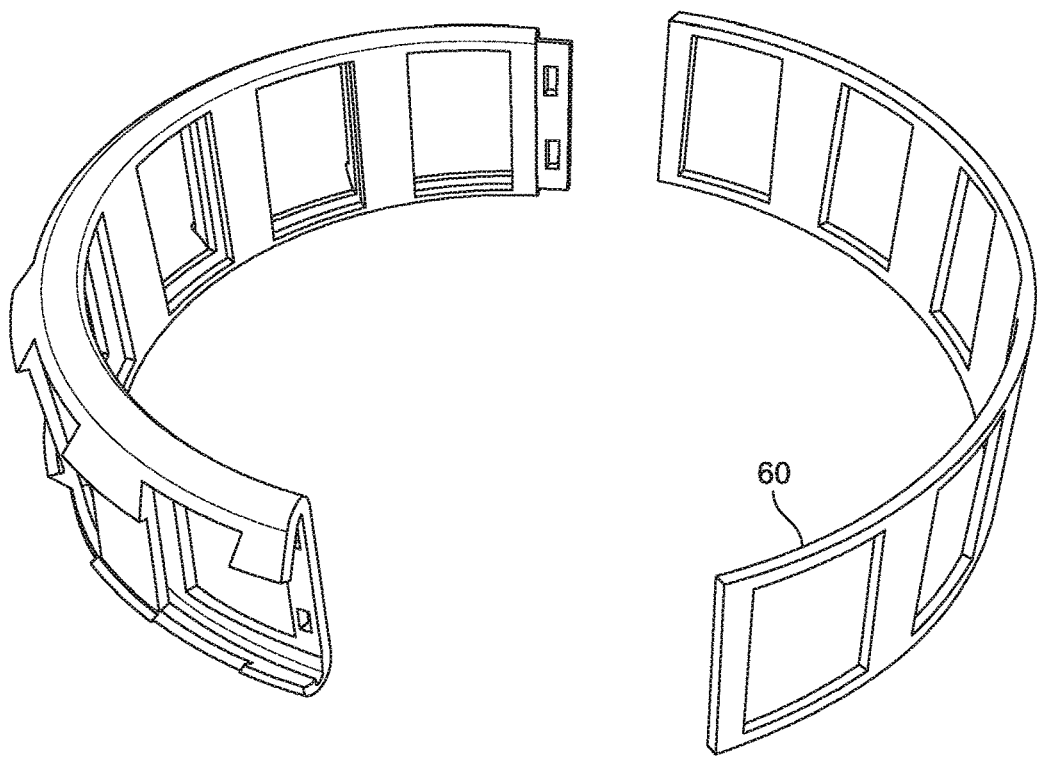
FIG. 19 illustrates an exemplary rolling element bearing cage assembly consistent with FIGS. 16 to 18.
Figure 20:
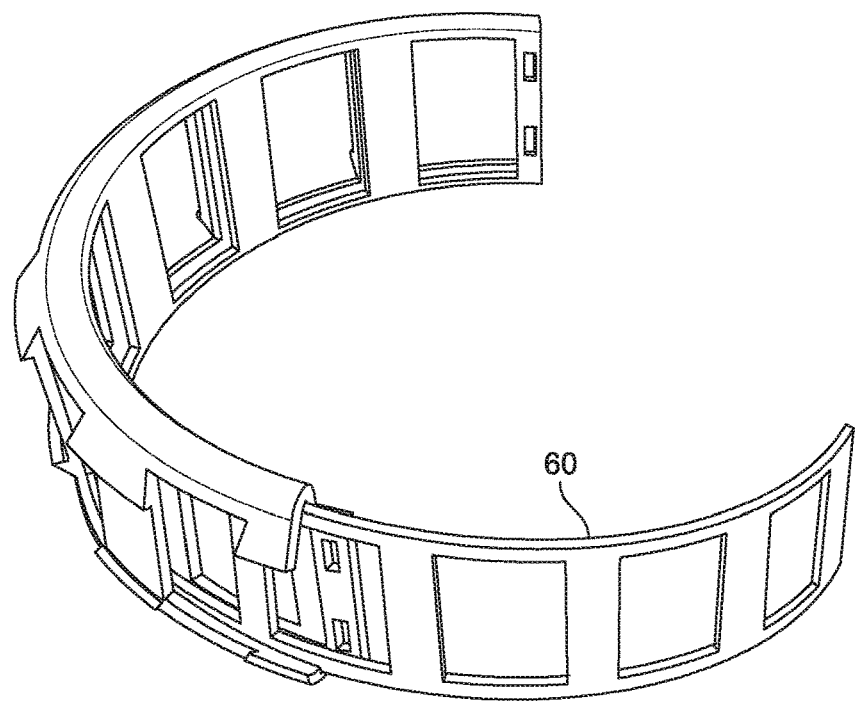
FIG. 20 illustrates an exemplary rolling element bearing cage assembly consistent with FIGS. 16 to 19.

The material 60 may be formed and shaped separately to the forming and shaping of the cylindrical rolling element bearing cage structure, and then integrated with the half rolling element bearing cage structure. FIG. 19 shows a cylindrical half rolling element bearing cage structure and a corresponding material 60, suitably shaped for inserting. FIG. 20 shows the material 60 being inserted to the rolling element bearing cage structure.

The material 60 may be a different material to that with which the remainder of the rolling element bearing cage structure is formed. The material 60 may provide a wear strip, which has different properties than the remainder of the material of the rolling element bearing cage structure. The main rolling element bearing cage structure may be formed of one material of a first cost, and then the material 60 of a second cost added. The second cost may be higher than the first cost, but the overall cost of the rolling element bearing cage assembly is reduced compared to what would have been required to manufacture the whole rolling element bearing cage assembly with the second material.

An example of the material 60 is brass, bronze or Tough-Met®, but other materials could also be used.

Overall the use of the additional material 60 allows an integrated rolling element bearing cage structure to be formed which has better properties than the homogenous rolling element bearing cage structure previously defined.

With this technique the material 60 can be provided of a different type of material to the remainder of the rolling element bearing cage structure.

The arrangement of FIG. 18 illustrates a different arrangement for connecting cylindrical rolling element bearing cage halves: the arrangement will be different in different implementations, and in general some mechanism for each half of the rolling element bearing cage to engage is required. Of course, as noted above, there may be more than two segments, but the arrangement is described with reference to two halves.

Figure 21A:
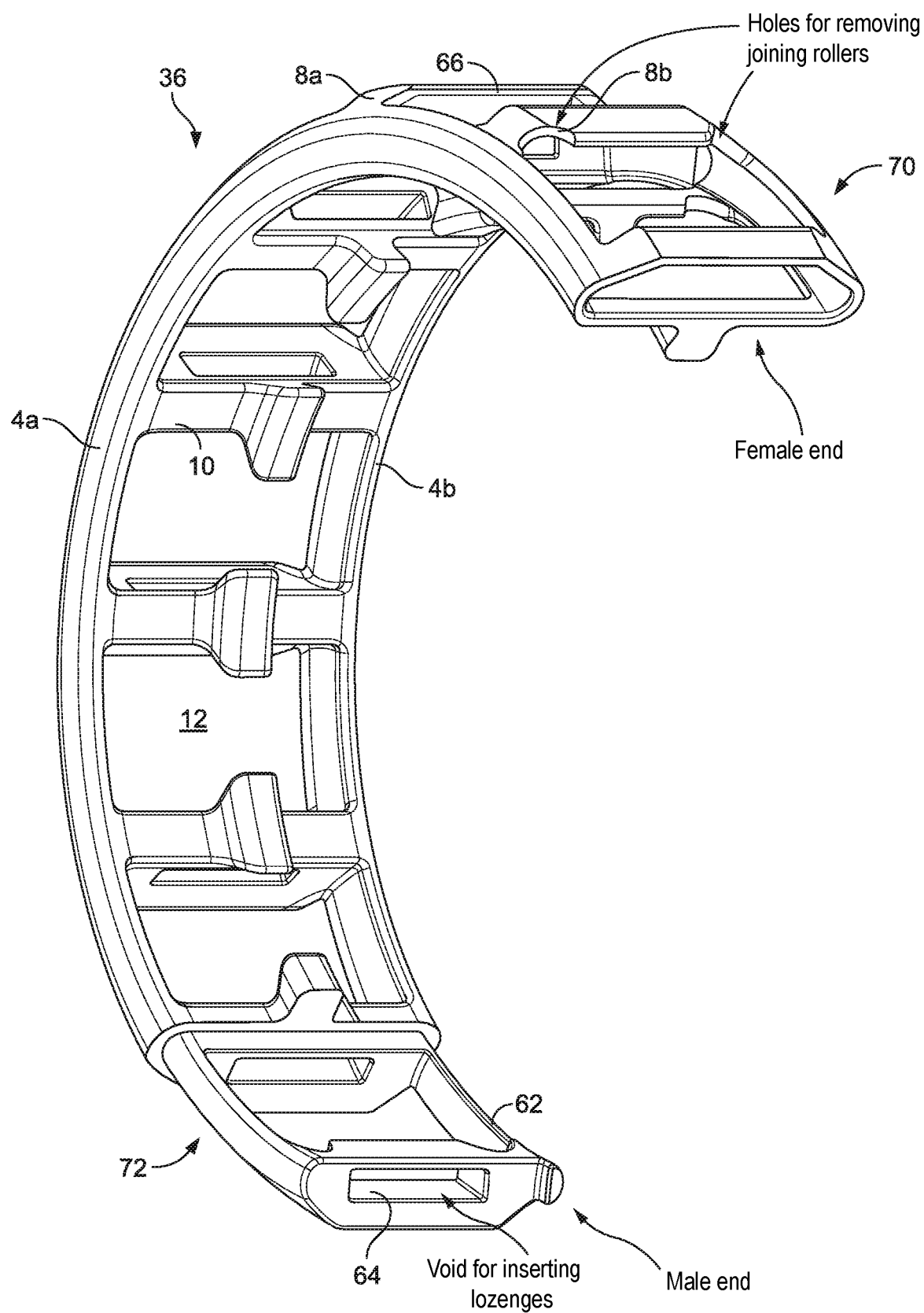
FIGS. 21A, 21B, and 21C illustrate an exemplary rolling element bearing cage assembly having an outer cage and an inner insert.
Figure 21B:
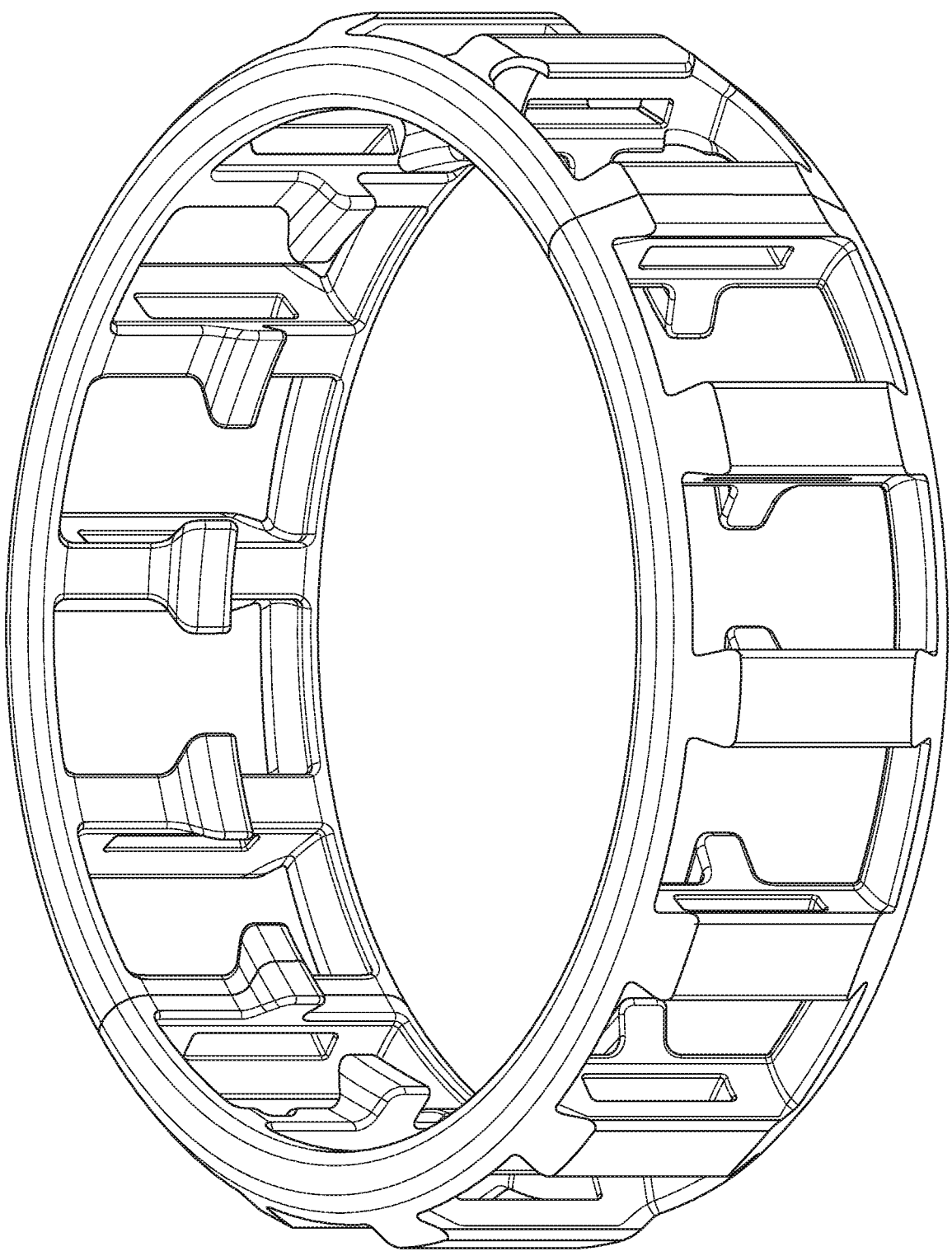
Figure 21C:
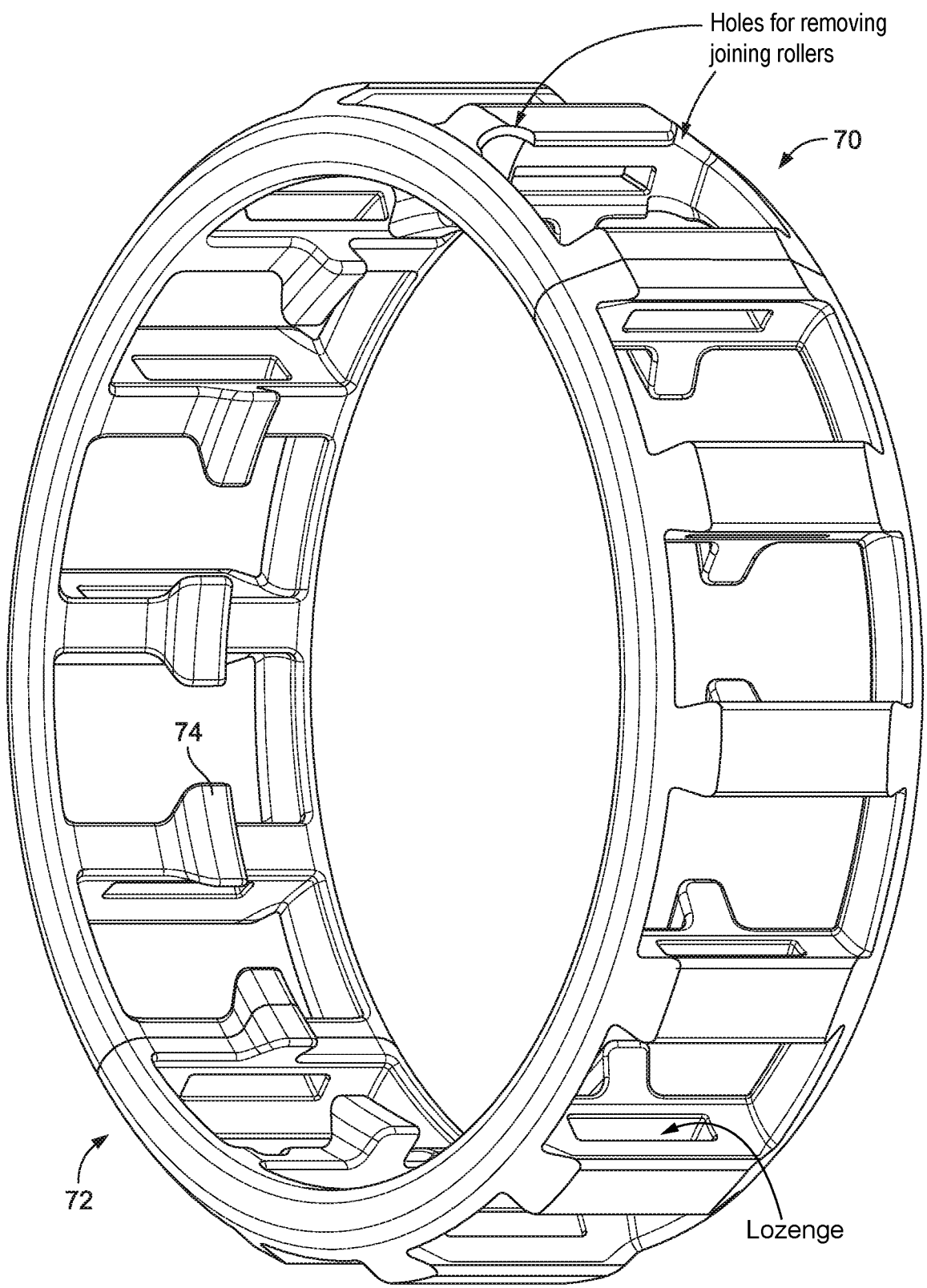

An alternative implementation for assembling a rolling element bearing cage assembly and including an additional material therein is illustrated with respect to FIGS. 21A to 21C. Again this is described with reference to two halves, but in general applies to multiple segments.

FIG. 21A shows part of a rolling element bearing cage assembly 36, including the annular rings 4a and 4b joined by retainer portions 10, and having spacer segments 12. In the example as shown in FIG. 21A, opposing resilient tangs are joined. Thus the tangs 8a and 8b are joined by a portion 66 as shown.

An additional material is formed having the same general shape as the portion of the rolling element bearing cage assembly part 36, which can be slotted into the structure comprising the annular rings 4a, 4b. Thus there is shown a portion 62 which has retainer portions and spacer segments which are consistent with the retainer portions and spacer segments of the rolling element bearing cage assembly 36 when slotted through.

Thus, in general, a rolling element bearing cage is formed of one or more segments. Each segment comprises a supporting frame 36 having a plurality of spaced apart openings each for accommodating a rolling element. Each segment also comprises a reinforcing frame 62, inserted within the supporting frame, and having a corresponding plurality of openings each for aligning with the openings of the supporting frame.

The supporting frame has an internal void through which the reinforcing frame is formed.

Preferably each end of the portions 62 is provided with an engagement mechanism, which engages with another insert to another half of a rolling element bearing cage assembly.

As shown in FIG. 21A, each portion of the insert 62 which sits between a retainer portion and its associated resilient tang pairs has a slot or cavity 64 therein.

The insert 62 may be formed of an additional material as discussed hereinabove.

The supporting frame 36 and the reinforcing frame 62 may be formed of the same or different materials. If different, one material may be more excessive than the other, and/or one material may be more robust or durable than the other.

FIG. 21B shows the half rolling element bearing cage assembly 36 paired with another half rolling element bearing cage assembly, with the insert 62 fully inserted within each half. Each insert 62 is provided with an engagement mechanism at its end, which engages with the insert of the other half of the rolling element bearing cage assembly. Thus the two halves of the rolling element bearing cage assembly are secured together by the engagement between the two inserts 62.

As shown in FIG. 21A, a portion of the reinforcing frame 62 protrudes from one end of the supporting frame 36, and as a consequence (as the reinforcing frame 62 and supporting frame 36 have the same circumferential dimension), a part of the opening in the supporting frame provides a void where the reinforcing frame would otherwise be.

Based on this structure, one half of the rolling element bearing cage may be connected to another half of the rolling element bearing cage. The protruding portion of the reinforcing frame 62 in one half of the rolling element bearing cage may engage with the void in the supporting frame 36 of another half of the rolling element bearing cage. The portion of the supporting frame 36 having a void may engage with a protruding portion of the reinforcing frame 62 of another half, by receiving this protruding portion inserted into the void.

Thus, as shown in FIG. 21B, the two halves of the rolling element bearing cage may be joined together.

As can be seen in FIG. 21A, the supporting frame 36 is preferably provided with internal grooves in first and second annular rings thereof, which are shaped to accommodate edges (which are also suitably shaped) of the reinforcing frame. As described above, the supporting frame 36 can be considered as being formed of first and second annual rings, and the reinforcing frame can be considered to be a third annular ring. However the reinforcing frame will also be considered to be formed of third and fourth annular rings, which are joined together by its own retainers which coincide with the retainers of the supporting frame, the reinforcing frame also having spacer portions which coincide with the spacer portions of the supporting frame.

As shown in FIG. 21A, one spacer segment or opening of the reinforcing frame protrudes from the supporting frame, although in general one or more openings of the reinforcing frame may protrude from the supporting frame. As such, one or more openings of the supporting frame are not aligned with an opening of the reinforcing frame, where the void is provided in the supporting frame. All other openings of the supporting frame are aligned with an opening of the reinforcing frame.

A rolling element is preferably provided in each opening of the assembled rolling element bearing cage as shown in FIG. 21B. By inserting a rolling element into each opening, the two halves of the rolling element bearing cage are secured, and the two halves cannot be pulled apart.

The rolling element may be any one of a cylindrical roller, a tapered roller, a spherical roller, or a ball. This applies in general to the rolling element bearing cage described in any example herein, with reference to FIG. 1 onwards.

It can be seen from FIG. 21A that the reinforcing frame is provided within the supporting frame, and the reinforcing frame and the supporting frame are manufactured to have the same circumferential dimension. The reinforcing frame is then rotated with respect to the supporting frame by at least one complete retainer portion, one opening, and part of one further retainer portion. Thereby a section of the reinforcing frame protrudes from the supporting frame and a section of the supporting frame has a recess section where the reinforcing frame is rotated from: creating a void. The section of the reinforcing frame protruding from the supporting frame can engage with the recessed section of the supporting frame of another segment of the rolling element bearing cage.

In general, one rolling element is required in order to securely attach one segment of the rolling element bearing cage to another segment of the rolling element bearing cage, being a rolling element which is positioned in a spacer segment which is provided by the supporting frame of one segment and the reinforcing frame of another segment.

In general, as noted above, the reinforcing frame has the same circumferential dimension as the supporting frame. Each of the reinforcing frame and the supporting frame also has a number of retainer portions which coincide with each other positionally, and the number of spacer segments which also coincide with each other dimensionally. When the reinforcing frame is fully inserted within the supporting frame such that their circumferential dimensions overlap, the retainer portions and the spacer segments coincide with each other.

In the example of FIGS. 21A and 21B, the insert 62 is provided with a plurality of voids 64 at each of the positions of the resilient tang pairs.

Turning to FIG. 21C, each insert is used to accommodate a "lozenge". These lozenges may also be made of Tough-Met® material. In general the material of these lozenges—or inserts in the voids 64—may be the same or different to the materials of the supporting frame or the reinforcing frame.

Thus the final structure, as shown in FIG. 21C, may be formed of three different elements, and each element may be formed of a different material. Alternatively two or more of the materials may be the same. Alternatively all of the materials may be the same.

Thus with the arrangement of FIG. 21A to 21C there is provided an arrangement in which two halves of a rolling element bearing cage assembly (which may more generally be extended to two or more segments of a rolling element bearing cage assembly) are connected together by virtue of an insert which is formed with a mechanism for engaging with another insert in another part of the rolling element bearing cage assembly. This input may be formed of an additional material which is different to the remainder of the cage, or may be formed of the same material. Inserts may be added to voids formed therein, such as the "lozenges", to provide the additional material.

Once thus formed, the rolling element bearing cage assembly formation may be secured using a rolling element.

The rolling element bearing cage assembly is thus provided having sections which are joined by parts of the rolling element bearing cage assembly having an inner section and an outer section, with the inner section being angularly rotated relative to the outer section, creating an engagement mechanism in the inner section which slots into an engagement section of the outer section. Two or more parts (segments) of a rolling element bearing cage assembly can then be connected.

The inner section preferably protrudes from the outer section by a complete space segment as shown in FIG. 21A, and a complete retainer portion. A rolling element is inserted in the locations denoted by reference numerals 70 and 72 in FIGS. 21A and 21B, with these rolling elements providing a secure connection for a rolling element bearing cage assembly (which in this case is made up of two halves).

It will follow from an understanding of the above discussion, that there is also provided a method of forming a rolling element bearing cage assembly, which comprises forming one or more segments such as set out above. The forming of each segment may thus comprise forming a supporting frame having a plurality of spaced apart openings, forming a reinforcing frame including a corresponding plurality of openings each for aligning with the openings of the supporting frame, and inserting the reinforcing frame within the supporting frame. The supporting frame and the reinforcing frame preferably have the same circumferential dimension.

As shown in the arrangement of FIGS. 21A to 21C, the rolling element bearing cage assembly may be provided with protrusions on the retainer portions, as denoted by reference numeral 74. These protrusions may ride on an inner race, an outer race, or clamping rings etc.

As well as manufacturing the rolling element bearing cage structure in accordance with manufacturing techniques for bending and folding a material such as a metal material, the rolling element bearing cage structure may also be manufactured using 3D moulding, 3D printing or additive manufacturing techniques.

Figure 22:
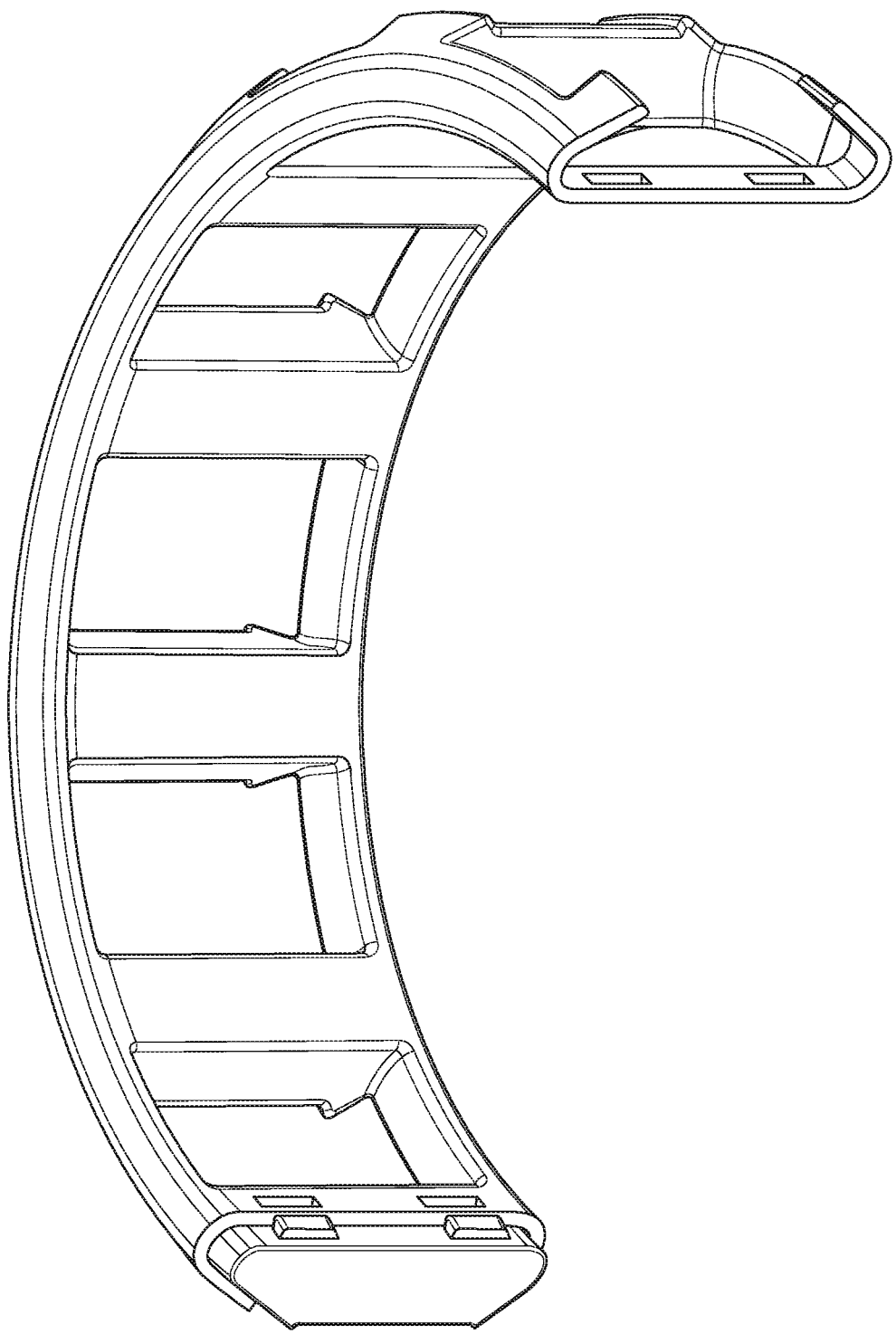
FIG. 22 illustrates half of a rolling element bearing cage assembly manufactured by 3D moulding, 3D printing, additive manufacturing.

FIG. 22 illustrates half a rolling element bearing cage, an equivalent structure to that of FIG. 10, formed by 3D moulding, 3D printing or additive manufacturing techniques.

Figure 23:
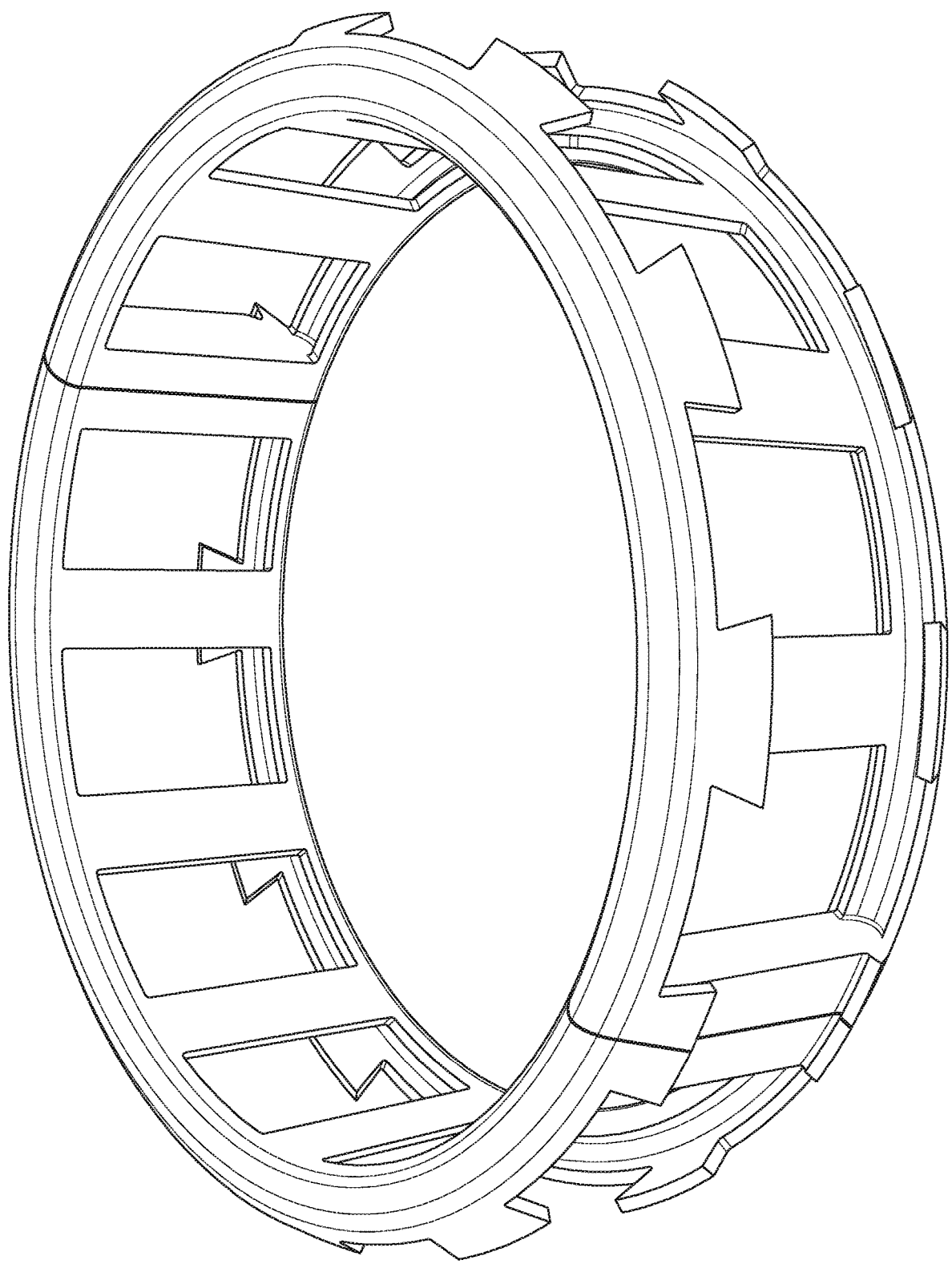
FIG. 23 illustrates a rolling element bearing cage assembly manufactured by 3D moulding, 3D printing, additive manufacturing.

FIG. 23 illustrates a full rolling element bearing cage structure, equivalent to the view of FIG. 1, formed as a single structure by 3D moulding, printing or additive manufacturing techniques.

Examples described herein make reference to the formation of half rolling element bearing cage assemblies, two of which are connected to form a whole rolling element bearing cage assembly. In practice a rolling element bearing cage assembly may be formed of any number of segments, and any size of segments of the rolling element bearing cage assembly—such as quarters or thirds—may be made and jointed together.

It should be noted that reference to a cage herein refers to a whole or part of a cage assembly. Such a cage may be manufactured from any metal material, any plastic material, or any combination of any metal material and/or any plastic material. A cage may be made from metal or a shaped plastic sheet.

Cages manufactured in accordance with the described examples will not require any subsequent bending, folding, riveting or any other machine process.

Cages manufactured in accordance with the described examples can be manufactured with virtually no tool cost.

The invention has been described with reference to particular examples and embodiments, none of which are limiting. Different embodiments may be combined, and different features of different embodiments may be combined with features of other embodiments. The scope of protection is defined by the appended claims.

The invention claimed is:

1. A method of forming a rolling element bearing cage assembly, comprising forming one or more segments, the forming of each segment comprising:
   forming a supporting frame having a plurality of spaced apart openings along a circumferential length of the supporting frame;
   forming at least one cavity in a cross-section of the supporting frame, the at least one cavity extending along the circumferential length of the supporting frame;
   forming a reinforcing frame including a corresponding plurality of openings along a circumferential length of the reinforcing frame, each for aligning with the openings of the supporting frame; and
   inserting the circumferential length of the reinforcing frame within the at least one cavity of the circumferential length of the supporting frame such that the supporting frame at least partially encases the reinforcing frame and the plurality of openings along the circumferential length of the reinforcing frame align with the plurality of openings along the circumferential length of the supporting frame.

2. The method of claim 1 comprising forming the supporting frame of a first material and forming the reinforcing frame of a second material, the second material being different to the first material.

3. The method of claim 1 comprising providing the reinforcing frame with a plurality of internal voids, the voids being filled with a filling material.

4. The method of claim 1 wherein the supporting frame and the reinforcing frame form an integral frame, and the integral frame is provided with a plurality of internal voids, the voids being filled with a filling material.

5. The method of assembling forming a rolling element bearing cage assembly according to claim 1, wherein:
   forming the supporting frame comprises:
   forming a part of a cylinder-type structure comprising part of a first annular ring and part of a second annular ring held connected by a plurality of retainer portions, and
   forming the reinforcing frame comprises:
   forming a part of a further cylinder-type structure comprising part of a further first annular ring and part of a further second annular ring held connected by a plurality of further retainer portions,
   wherein the step of inserting comprises providing the reinforcing frame through the at least one cavity in the supporting frame.

6. The method of claim 5 wherein a void is formed in each retainer portion.

7. The method of assembling forming a rolling element bearing cage assembly according to claim 6, wherein:
   forming the supporting frame comprises:
   forming a part of a cylinder-type structure comprising part of a first annular ring and part of a second annular ring held connected by a plurality of retainer portions, and
   wherein the step of inserting comprises providing the reinforcing frame through the at least one cavity in the supporting frame.

8. The method of claim 7 wherein the cylinder type structure comprises a plurality of tangs formed along the outer circumference of each of the first and second annular rings, at an angle to the plane of the respective annular ring and toward the other annular ring.

9. The method of claim 7 wherein at least part of the cylinder-type structure is formed using 3D moulding, 3D printing or 3D additive manufacturing.

10. The method of claim 7 wherein the at least part of the cylinder-type structure is at least part of the rolling element bearing cage, and one or more parts are connected to form a rolling element bearing cage.

11. The method of claim 1 wherein the step of inserting is such that at least one opening of the reinforcing frame protrudes from the supporting frame, at least one opening of the supporting frame is not aligned with the one or more openings of the reinforcing frame, and each other opening of the supporting frame is aligned with an opening of the reinforcing frame, the method further comprising:
   connecting the one or more segments, the connecting comprising:
   engaging the protruding portion of the reinforcing frame of a first segment with the recessed portion of the supporting frame of a second segment such that the one or more openings of that protruding portion of the reinforcing frame aligns with the one or more openings in that supporting frame not aligned with the one or more openings of the reinforcing frame of that segment.

12. The method of claim 11, wherein the step of connecting further comprises:
   engaging the protruding portion of the reinforcing frame of the second segment with the supporting frame of the first segment such that the one or more openings of that reinforcing frame aligns with the one or more openings in that supporting frame not aligned with an opening of the reinforcing frame of that segment.

13. The method of claim 12, further comprising the step, after the connecting, of:
   inserting a rolling element in each opening.

14. The method of claim 12 wherein the rolling element bearing cage assembly comprises a plurality of segments, which, when all connected, form a cylindrical-type structure.

15. The method of claim 1 wherein the cross-section of the support frame defining the at least one cavity fully encases the reinforcing frame.

16. A method of forming a rolling element bearing cage assembly, comprising forming one or more segments, the forming of each segment comprising:
   forming a supporting frame having a plurality of spaced apart openings;
   forming a reinforcing frame including a corresponding plurality of openings each for aligning with the openings of the supporting frame; and
   inserting the reinforcing frame within at least one cavity of the supporting frame such that the supporting frame at least partially encases the reinforcing frame,
   wherein the at least one cavity is formed in a cross-section of the supporting frame, the at least one cavity extending at least partially along a circumferential length of the supporting frame.

* * * * *